United States Patent [19]

Nakano et al.

[11] Patent Number: 4,829,433
[45] Date of Patent: May 9, 1989

[54] CONTROL SYSTEM FOR CONTINUOUSLY VARIABLE TRANSMISSION

[75] Inventors: Masaki Nakano, Kawasaki; Haruyoshi Kumura, Kamakura, both of Japan

[73] Assignee: Nissan Motor Co., Ltd., Yokohama, Japan

[21] Appl. No.: 915,681

[22] Filed: Oct. 6, 1986

[30] Foreign Application Priority Data

Oct. 7, 1985 [JP] Japan .................................. 60-221899
Oct. 7, 1985 [JP] Japan .................................. 60-221900

[51] Int. Cl.$^4$ ............................................ B60K 41/16
[52] U.S. Cl. .............................. 364/424.1; 192/4 A; 74/866; 74/867
[58] Field of Search ............. 364/424.1; 74/866, 865, 74/867; 474/28, 18, 12, 101, 103; 192/4 A

[56] References Cited

U.S. PATENT DOCUMENTS

| | | | |
|---|---|---|---|
| 4,458,318 | 6/1984 | Smit et al. ........................ | 364/424.1 |
| 4,533,340 | 8/1985 | Abo et al. ........................... | 474/28 |
| 4,559,029 | 12/1985 | Miranti, Jr. et al. ................ | 474/251 |
| 4,597,308 | 7/1986 | Tanaka et al. ...................... | 74/866 |
| 4,603,602 | 8/1986 | Tanaka et al. ...................... | 74/866 |
| 4,660,440 | 4/1987 | Matsumura et al. ................ | 74/866 |
| 4,670,843 | 6/1987 | Matsumura et al. ............ | 74/866 X |
| 4,702,128 | 10/1987 | Ostriage .............................. | 74/866 |
| 4,731,044 | 3/1988 | Mott .................................. | 474/101 |
| 4,732,055 | 3/1988 | Tateno et al. ..................... | 364/424.1 |
| 4,736,655 | 4/1988 | Kumura et al. .................. | 364/424.1 |

FOREIGN PATENT DOCUMENTS

| | | |
|---|---|---|
| 0140228 | 5/1985 | European Pat. Off. ......... 364/424.1 |
| 0139277 | 5/1985 | European Pat. Off. ......... 364/424.1 |
| 3504763A1 | 10/1985 | Fed. Rep. of Germany . |
| 58-170958 | 10/1983 | Japan . |
| 58-170959 | 10/1983 | Japan . |

OTHER PUBLICATIONS

E. Samal, Chapter 4, pp. 312 & 313, Grundriss der praktischen Regelungstechnik; R. Oldenbourg-Verlag, 1960.
Antriebstechnik, 24, 1985, No. 2, pp. 49 to 51.

*Primary Examiner*—Parshotam S. Lall
*Assistant Examiner*—V. N. Trans
*Attorney, Agent, or Firm*—Foley & Lardner, Schwartz, Jeffery, Schwaab, Mack, Blumenthal & Evans

[57] ABSTRACT

A control system for a continuously variable transmission for a vehicle, includes a hydraulically operable driver pulley, a follower pulley, a transmission V-belt tensioned between the driver and follower pulleys, and means, including a shift actuator and a shift control valve, for hydraulically controlling a reduction ratio between the driver and follower pulleys. In order to provide inproved shift response of the transmission upon depressing an accelerator pedal after a quick brake state of a vehicle where the vehicle wheels are locked, a position of a movable conical disk of the driver pulley which it would assume after initiation of the quick brake state is determined by arithmetic operation, and a shift actuator is driven toward a position thereof corresponding to the position assumed by the driver pulley so that the V-belt is tensioned between the driver and follower pulleys and conditioned to be ready for torque transmission.

18 Claims, 13 Drawing Sheets

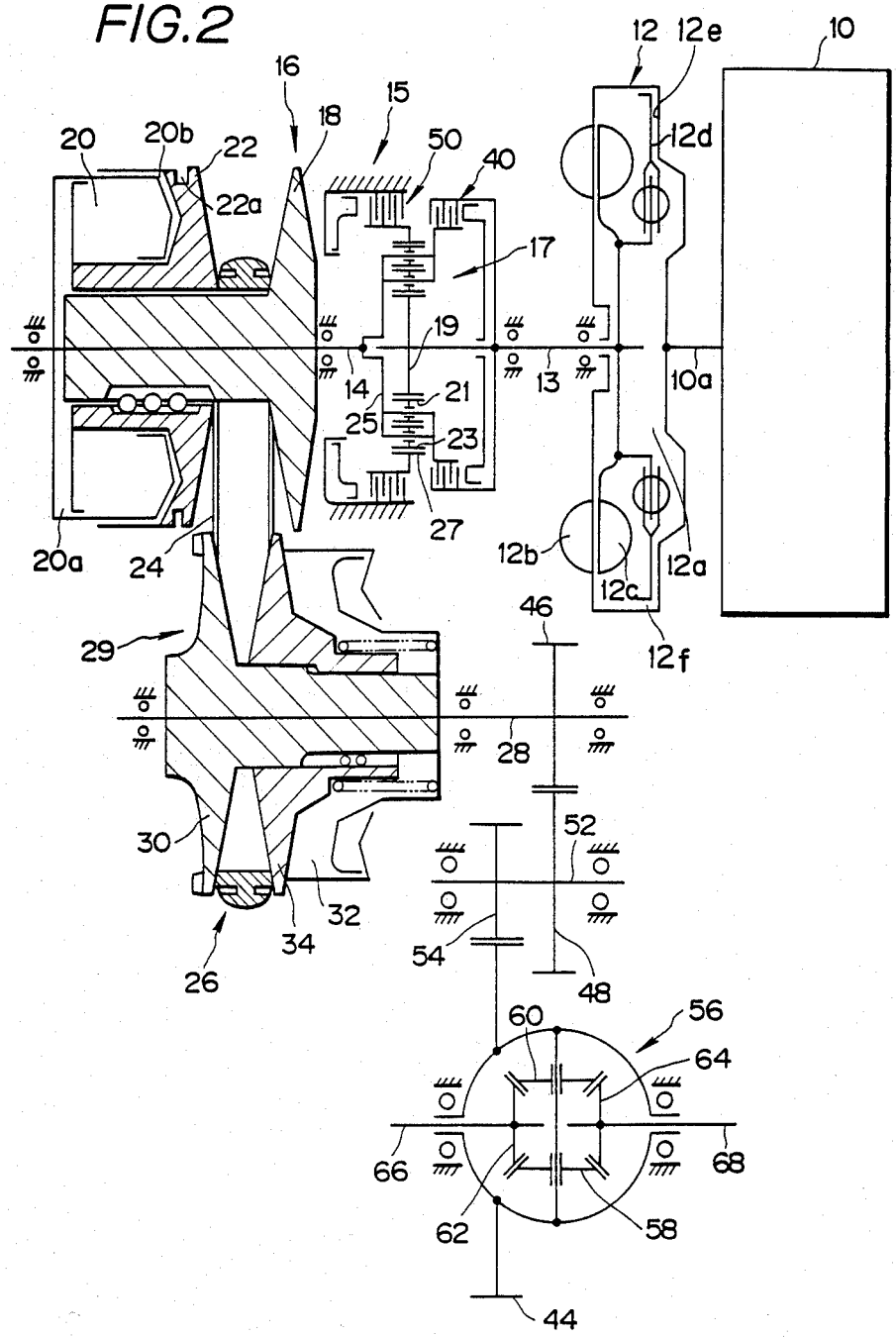

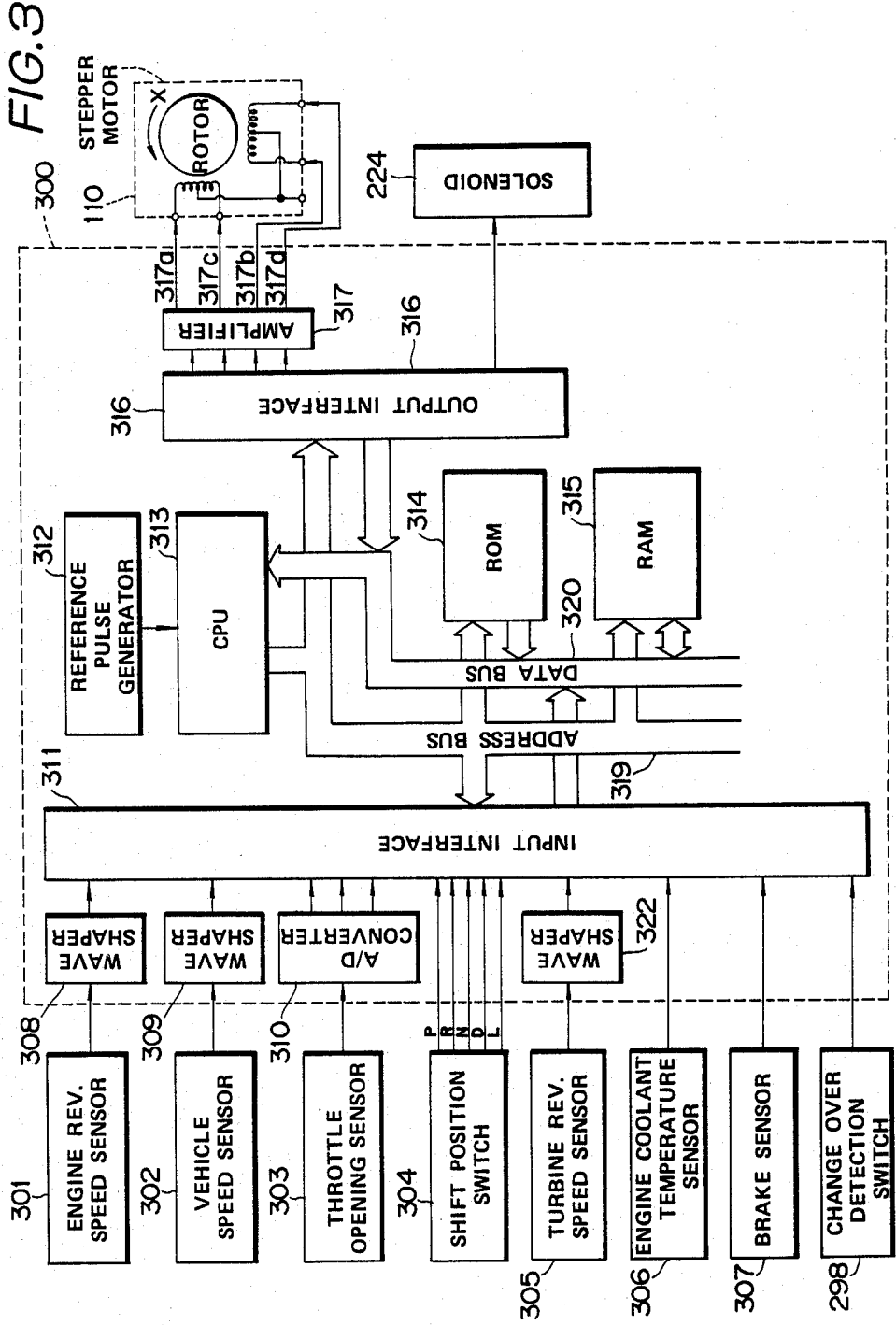

CONTROL SYSTEM FOR CONTINUOUSLY VARIABLE TRANSMISSION

BACKGROUND OF THE INVENTION

The present invention relates to a control system for a continuously variable transmission.

Laying-open Japanese patent application No. 58-170958 discloses a method of controlling a reduction ratio established in a continuously variable transmission including a transmission V-belt tensioned between a driver pulley and a follower pulley. According to this known method, an actuator for effecting a shift in reduction ratio is activated upon receiving a brake signal which is generated when the driver depressing a foot brake to initiate downshift toward the largest reduction ratio.

Laying-open Japanese patent application No. 58-170959 discloses another method of controlling a reduction ratio established in a continuously variable transmission. According to this known method, an actuator for effecting a shift in reduction ratio is activated upon detecting the fully closed state of a throttle valve to initiate downshift toward the largest reduction ratio.

According to the known method mentioned above, since the downshift operation starts immediately after receiving the brake signal or upon detecting the fully closed state of the throttle valve, the effective engine brake running is obtained quickly in the case of a continuously variable transmission that has a releatively slow shift speed. However, since the downshift operation is initiated upon anticipating the need for engine brake running, the transmission starts shifting down if the driver steps on the brake pedal without demanding the engine brake effect. In this case, the vehicle's performance fails to correspond to the driver's feeling.

Another problem encountered in the known control system carrying out the above mentioned method is that if, after quick brake to such an extent that the vehicle's driving wheels are locked to stop rotation of the transmission output shaft, the driver depresses the accelerator pedal, the transmission V-belt slips, failing to transmit torque, causing the V-belt to wear badly to result in shortened operating life. This is because the speed at which the transmission downshifts is not as high as the speed at which the quick brake operation progresses and besides the shifting response is very poor after the follower pulley that is rotatable with the transmission output shaft has stopped its rotation. This brings about the situation where the hydraulic fluid is being discharged from the driver pulley and sufficiently high friction does not exist between the transmission V-belt and the pulley when the accelerator pedal is depressed, causing the V-belt to slip.

An object of the present invention is to improve a control system for a continuously variable transmission such that immediately after quick brake has been released, a transmission V-belt is held tensioned between driver and follower pulleys and thus can transmit torque without any slip between the pulleys and the V-belt when an engine torque is applied to the driver pulley again.

Another object of the present invention is to improve a control system for a continuously variable transmission such that the transmission downshifts at a satisfactorily high speed during quick brake operation.

SUMMARY OF THE INVENTION

According to the present invention, there is provided a control system for a continuously variable transmission for a vehicle, including a hydraulically operable driver pulley, a follower pulley, a transmission V-belt tensioned between the driver and follower pulleys, and means, including a shift actuator and a shift control valve, for hydraulically controlling a reduction ratio between the driver and follower pulleys. The control system comprises:

means for determining a position assumed by the driver and driven pulleys during a predetermined operating period after initiation of a pedetermined quick brake state of the vehicle;

means for driving the shift actuator toward a position thereof corresponding to said position determined by said determining means during said predetermined operating period.

According to another aspect of the present invention, there is provided a control method for a continuously variable transmission for a vehicle, including a hydraulically operable driver pulley, a follower pulley, a transmission V-belt tensioned between the driver and follower pulleys, and means, including a shift actuator and a shift control valve, for hydraulically controlling a reduction ratio between the driver and follower pulleys. The control method comprises the steps of:

determining a position assumed by the driver and driven pulleys during a predetermined operating period after initiation of a predetermined quick brake state of the vehicle;

driving the shift actuator toward a position thereof corresponding to said position determined by said determining step during said predetermined operating period.

The position assumed by the driver pulley is determined by arithmetic operation or may be directly detected by a suitable position sensor.

BRIEF DESCRIPTION OF THE DRAWINGS

FIG. 2 is a schematic diagram showing a power transfer mechanism of the continuously variable transmission;

FIG. 3 is a block diagram showing a control unit operatively connected with a stepper motor and a solenoid shown in FIG. 1A;

FIGS. 11 to 14, when combined, illustrate another flowchart.

DESCRIPTION OF THE EMBODIMENTS

Figure 1A:
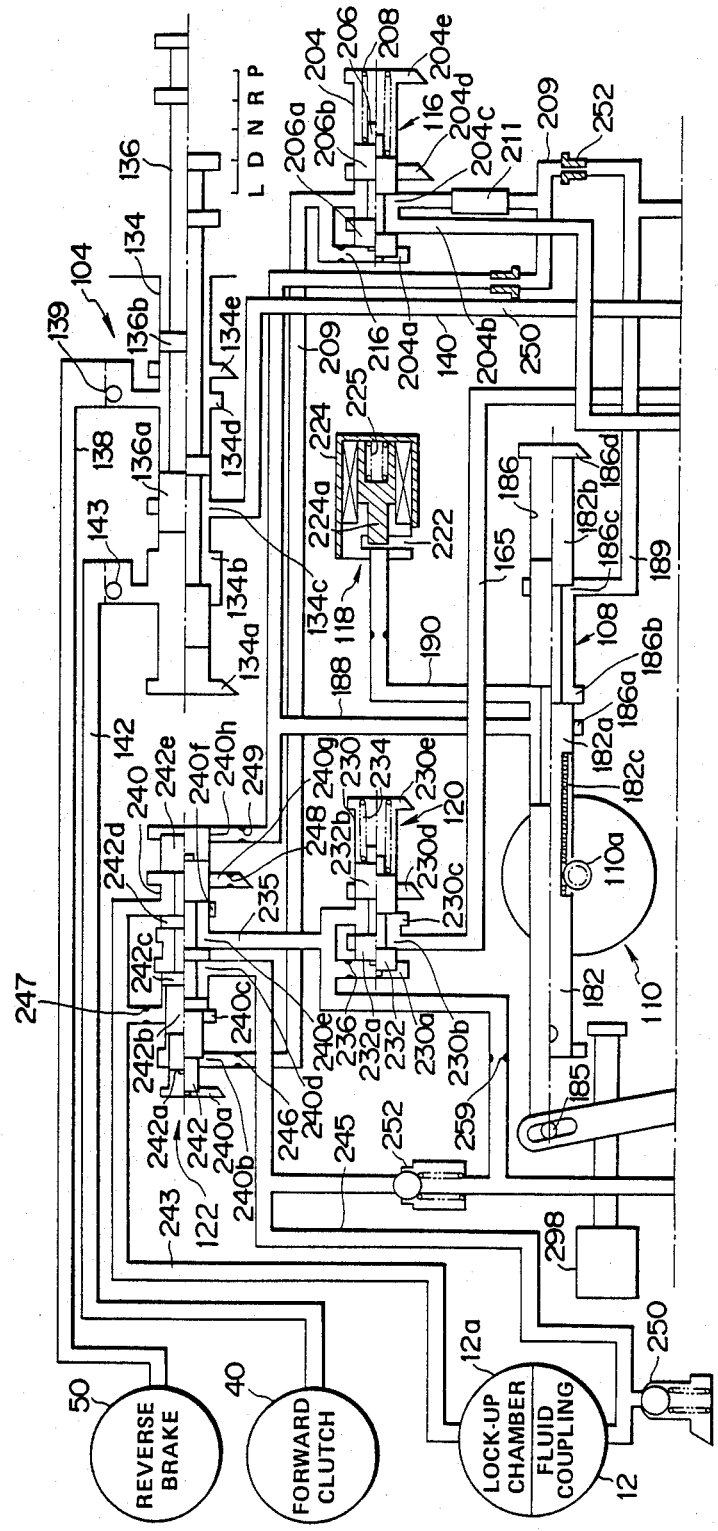
FIGS. 1A and 1B, when combined, illustrate a hydraulic circuit diagram showing a control system for a continuously variable transmission according to the present invention.
Figure 1B:
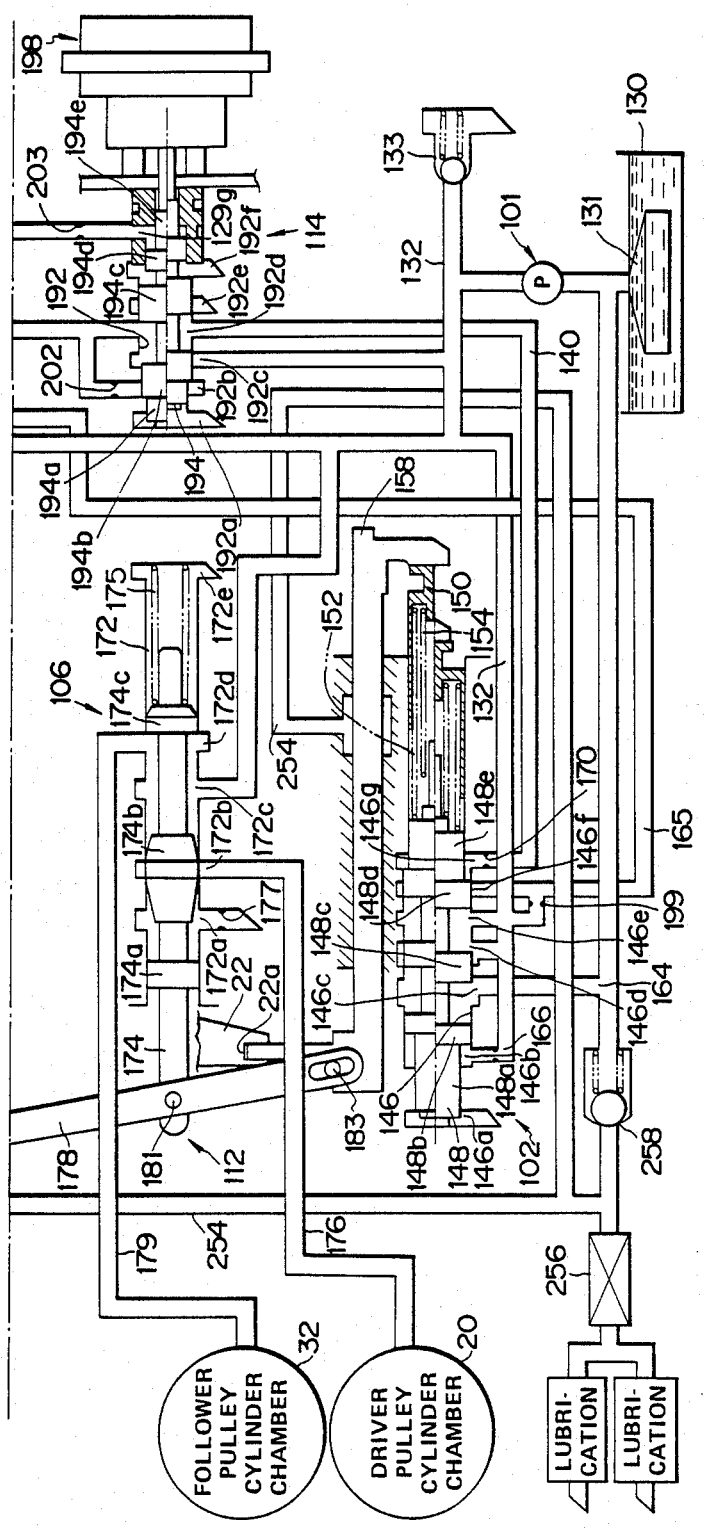

Referring to the accompanying drawings, FIG. 1 shows a power transfer mechanism of a continuously variable transmission, and FIGS. 1A and 1B, when combined, illustrate a hydraulic control system for the power transfer mechanism shown in FIG. 1. The detailed description of the power transfer mechanism and hydraulic control system is found in European patent application No. 85113788.5 (our Ref. No.: EP083-85) designated Federal Republic of Germany and claiming priority on Japanese patent application No. 59-226706 filed Oct. 30, 1984. This European patent application was published May 7, 1986 under publication No. 0180209. There is U.S. patent application Ser. No. 792,422 filed Oct. 29, 1985 and now abandoned and developed into a C-I-P application Ser. No. 922,400 filed on Oct. 23, 1986. This C-I-P application was issued on Apr. 5, 1988 under U.S. Pat. No. 4,735,113.

FIG. 2 shows an engine 10 having an output shaft 10a which is coupled with a hydrokinetic torque transmitting unit in the form of a fluid coupling 12. Fluid coupling 12 is equipped with a lock-up mechanism which is hydraulically operated and has a lock-up state where a pump impeller 12b, i.e., an input element, is mechanically connected with a turbine runner 12c, i.e., an output element, and a release state where the former is fluidly connected with the latter by controlling the direction in the supply of hydraulic fluid to pressure to the inside of fluid coupling 12 so as to drain a lock-up fluid chamber 12a or pressure build-up therein. The lock-up mechanism includes a friction clutch element 12d rotatable with turbine runner 12c. Clutch element 12d divides the inside of fluid coupling 12 into two chambers, including lock-up fluid chamber 12a, on the opposite sides thereof. When it is in the illustrated position in FIG. 2, clutch element 12d is disengaged from the adjacent end wall 12e rotatable with pump impeller 12b. This illustrated position is established when hydraulic fluid is supplied to lock-up chamber 12a. The hydraulic fluid is then allowed to pass through a clearance 12f formed around the outer periphery of clutch element 12d to flow into the inside of fluid coupling 12, i.e., a torous circuit formed by pump impeller 12b and turbine runner 12c. When hydraulic fluid is discharged from lock-up fluid chamber 12a and hydraulic fluid is supplied directly into the inside of fluid coupling 12, there occurs a pressure difference across clutch element 12d urging same into firm engagement with the adjacent wall 12e. The output element of fluid coupling 12 is coupled with a rotary shaft 13. Rotary shaft 13 is coupled with a forward/reverse drive change-over mechanism 15. Forward/reverse drive change-over mechanism 15 has a planetary gearing 17, a forward clutch 40, and a reverse brake 50. Planetary gearing 17 comprises a sun gear 19, a pinion carrier 25 having two pinion gears 21, 23, and a ring gear 27 (also called as an internal gear). Two pinion gears 21, 23 are intermeshed, pinion gear 21 meshes with sun gear 19, and pinion gear 23 meshes with ring gear 27. Sun gear 19 is coupled with rotary shaft 13 for unitary rotation therewith. Pinion carrier 25 is selectively coupled with rotary shaft 13 via forward clutch 40. Ring gear 27 is selectively held to a stationary portion via reverse brake 50. Pinion carrier 25 is coupled with a driver shaft 14 arranged coaxially with rotary shaft 13. Mounted on driver shaft 14 is a driver pulley 16. Driver pulley 16 comprises an axially stationary conical disk (pulley element) 18, and an axially movable conical disk (pulley element) 22 that is arranged in opposed relationship with axially stationary conical disk 18 so as to define a V-shaped pulley groove therebetween and displaceable in axial direction of driver shaft 14 under bias of hydraulic fluid pressure applied to a driver pulley cylinder chamber 20 (servo chamber). Driver pulley cylinder chamber 20 comprises two chambers 20a and 20b, and has a pressure acting area twice as large as a pressure acting area of a later described follower pulley cylinder chamber 32 (servo chamber). Driver pulley 16 is drivingly connected to follower pulley 26 via a V-belt 24. Follower pulley 26 is mounted on a follower shaft 28. Follower pulley 26 comprises an axially stationary conical disk 30 (follower pulley element) rotatable with follower shaft 28, and an axially movable conical disk 34 that is arranged in opposed relationship with axially stationary conical disk 30 so as to define a V-shaped pulley groove and displaceable in axial follower shaft 28 under the bias of hydraulic fluid pressure applied to a follower pulley cylinder chamber 32. Driver pulley 16, V-belt 24, and follower pulley 26 cooperate with each other to constitute a continuously variable V-belt transmission mechanism 29. Fixedly connected to follower shaft 28 is a driver gear 46 which is in mesh with an idler gear 48 rotatable with an idler shaft 52. Idler shaft 52 has a pinion gear 54 rotatable therewith, the pinion gear being in mesh with a final gear 44. A pair of pinion gears 58 and 60 that forms part of a differential 56 are fixedly attached to final gear 44 for rotation therewith. Pinion gears 58, 60 are in mesh with a pair of side gears 62, 64, respectively, which are coupled with a pair of output shafts 66, 68, respectively.

Torque fed to the power transfer mechanism mentioned above by output shaft 10a of engine 10 is transferred via fluid coupling 12 and rotary shaft 13 to forward/reverse drive change-over mechanism 15. Then, the torque is transferred to driver shaft 14 depending upon the state of forward/reverse drive change-over mechanism 15 such that when forward clutch 40 is engaged and reverse brake 50 is released, the torque of rotary shaft 13 is transferred, as it is in terms of amount and direction, to driver shaft 14 via planetary gearing 17, whereas when forward clutch 40 is released and reverse brake 50 is engaged, planetary gearing 17 acts to inverse the direction of torque in transferring it from rotary shaft 13 to driver shaft 14. The torque transferred to driver shaft 14 is transferred via driver pulley 16, V-belt 24, follower pulley 26, follower shaft 28, drive gear 46, idler gear 48, idler shaft 52, pinion gear 54, and final gear 44 to differential 56 where it is translated to rotate output shafts 66, 68 in a forward or reverse direction. It is to be noted that the neutral is established when both forward clutch 40 and reverse brake 50 are released. In the process of the above mentioned torque transfer, the ratio of rotation between driver pulley 16 and follower pulley 26 can be varied by altering the contact radius of driver pulley 16 with V-belt 24 and that of follower pulley 26 with V-belt 24 via axial displacement of axially movable conical disk 22 of driver pulley 16 and axial displacement of movable conical disk 34 of follower pulley 26. For example, if the width of V-shaped pulley groove of driver pulley 16 is increased and the width of V-shaped pulley groove of follower pulley 26 is decreased, the contact radius of the driver pulley side 16 becomes small whereas that of follower pulley 26 side becomes large. This results in establishing a reduction ratio larger than before. If axially movable conical disks 22 and 34 are displaced in the directions opposite to the directions in which the counterparts displaced in the above mentioned case, a reduction ratio becomes small.

FIGS. 1A and 1B illustrate a hydraulic fluid pump 101, a line pressure regulator valve 102, a manual valve 104, a shift control valve 106, an adjustment pressure change-over valve 108, a shift motor 110, a shift operation mechanism 112, a throttle valve 114, a constant pressure regulator valve 116, an electromagnetic valve 118, a coupling pressure regulator valve 120, and a lock-up control valve 122.

Hydraulic fluid pump 101 draws in hydraulic fluid (oil) from a tank 130 via a strainer 131, and discharge it into hydraulic fluid line 132. Hydraulic fluid line 132 conducts the discharged fluid to ports 146b, 146d and 146e of line pressure regulator valve 102 where pressure regulation is effected to build up a predetermined pressure, i.e., a line pressure which will be described later. Hydraulic fluid line 132 is allowed to communicate with a port 192c of a throttle valve 114 and a port 172c of shift control valve 106, too. Line 132 communicates also with a port 204b of constant pressure regulator valve 116. Provided in fluid line 132 is a line pressure relief valve 133 that prevents abnormal increase in line pressure.

Manual valve 104 has a valve bore 134, formed within a valve body, that is provided with five ports 134a, 134b, 134c, 134d, and 134e, and a spool 136 having two lands 136a and 136b which cooperate with the valve bore. Spool 136 which is urged to move by a selector lever (not shown), has five detent positions, namely P, R, N, D, and L ranges. Ports 134a and 134e are drain ports, and port 134b communicates with forward clutch 40 via hydraulic fluid line 142. Hydraulic fluid line 142 is provided with a one-way orifice 143 that provides a throttling effect only when hydraulic fluid is supplied to forward clutch 40. Port 134c communicates via a hydraulic fluid line 140 with ports 192b and 192d of throttle valve 114, and lastly port 134d communicates via a hydraulic fluid line 138 with reverse brake 50. Hydraulic fluid line 138 is provided with a one-way orifice 139 that provides a throttling effect only when hydraulic fluid is supplied to reverse brake 50. When spool 136 assumes P position, land 136a closes 134c that is subject to throttle pressure in hydraulic fluid line 140 produced via pressure regulation by the later described throttle valve 114 (clutch pressure regulator valve), forward clutch 40 is drained via hydraulic fluid line 142 and drain port 134a of valve bore 134, and reverse brake 50 is drained via hydraulic fluid line 138 and drain port 134e. When spool 136 assumes R position, ports 134c and 134d are allowed to communicate with each other via a space within the valve bore defined between lands 136a and 136b, and thus reverse brake 50 is supplied with throttle pressure from fluid line 140, whereas forward clutch 40 is drained via port 134a. When spool 136 assumes N position, port 134c is positioned between lands 136a and 136b, and thus it is prevented from communicating with the other ports, whereas ports 134b and 134d are drained, so that, similarly to the situation established when in P position, reverse brake 50 and forward clutch 40 are both drained. When spool 136 assumes D or L position, ports 134b and 134c are allowed to communicate with each other via a space within the valve bore defined between lands 136a and 136b, allowing supply of throttle pressure to forward clutch 40, whereas reverse brake 50 is drained via port 134e. As a result, power transfer is interrupted owing to the release of both forward clutch 40 and reverse brake 50 when spool 136 assumes P position or N position, thus preventing transfer of torque of rotary shaft 13 to driver shaft 14; output shafts 66 and 68 are driven in forward direction owing to engagement of reverse brake 50 when spool 136 assumes R position; and output shafts 66 and 68 are driven in reverse direction owing to engagement of forward clutch 40 when spool 136 assumes D or L position. As will be understood from the above description, there occurs no difference in terms of hydraulic pressure circuit between D position and L position, but a difference in position between them is electrically detected for use in controlling a shift motor 110 later described in shifting the transmission in accordance with different shift patterns.

Line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with valve bore 146, a sleeve 150 axially movable within valve bore 146, and two coaxially arranged springs 152 and 154 that are disposed between spool 148 and sleeve 150. Sleeve 150 in abutting engagement with a bias member 158 is urged to move to the left as viewed in FIGS. 1A and 1B in response to leftward movement of the bias member 158. Bias member 158 is mounted within the valve body in parallel to the axis of valve bore 146, and it is formed, at the opposite end portion, with an integral arm meshing with a circumferential groove 22a with which axially movable conical disk 22 of driver pulley 16 is formed. Arrangement is such that an increase in reduction ratio causes movement of sleeve 150 to the left, whereas a decrease in reduction ratio causes movement of sleeve 150 to the right. Among two springs 152 and 154, spring 152 arranged outside has opposite ends thereof always engaged by sleeve 150 and spool 148 and thus is always in its compressed state, whereas spring 154 inside is not compressed until sleeve 150 is moved to the left from a position indicated by the upper half thereof by a predetermined distance. Port 146a of line pressure regulator valve 102 is a drain port. Port 146g is supplied with throttle pressure from hydraulic fluid line 140 that serves as a throttle pressure circuit. Port 146c communicates with hydraulic fluid line 164 that serves as a drain circuit. Ports 146b, 146d, and 146e communicate with hydraulic fluid line 132 that serves as a line pressure circuit. Port 146f communicates via a hydraulic fluid line 165 with a port 230b of coupling pressure regulator valve 120. Hydraulic fluid line 165 communicates with line pressure line 132 via an orifice 199. Inlets to ports 146b and 146g are provided with orifices 166 and 170, respectively. As a result, spool 148 of line pressure regulator valve 102 is subject to two forces directed to the left, one due to spring 152 alone (or both of springs 152 and 154) and the other resulting from the fact that hydraulic fluid pressure (throttle pressure) applied to port 146g acts on a differential area between lands 148d and 148e, and it is also subject to a force directed to the right resulting from the fact that hydraulic fluid pressure (line pressure) applied to port 146b acts on a differential area between lands 148a and 148b. Thus, spool 148 effects pressure regulation to provide line pressure by adjusting the amount of drainage of hydraulic fluid from port 146d toward port 146c until equilibrium state is established where the above mentioned forces directed to the left and to the right balance with each other. As a result, line pressure becomes elevated as reduction ratio becomes large, and it is elevated also in response to a rise in throttle pressure applied to port 146g. The adjustment of line pressure in the above mentioned mabber meets the deamand that gripping force of pulleys applied to V-belt be increased as reduction ratio becomes large because engine output torque increases as throttle pressure rises (viz., engine manifold vacuum decreases) and power transfer torque due to friction is to be increased by increasing V-belt gripping force by pulleys.

Shift control valve 106 has a valve bore 172, formed within the valve body, that is provided with five ports 172a, 172b, 172c, 172d, and 172e, and a spool 174 having three lands 174a, 174b, and 174c which cooperate with valve bore 172, and a spring 175 biasing spool 174 to the left. Port 172b communicates via a hydraulic fluid line 176 with driver pulley cylinder chamber 20, and ports 172a and 172e are drain ports. The outlet of port 172a is provided with an orifice 177. Port 172d communicates via a hydraulic fluid line 179 with follower pulley cylinder chamber 32. Port 172c communicates with hydraulic fluid line 132 that serves as line pressure circuit, and is supplied with line pressure. Left end of spool 174 is rotatably mounted on a lever 178 of shift operation mechanism 112 which is later described by a pin 181 at a generally middle portion thereof. Because land 174b has an axial cross sectional configuration defined by a curved boundary, hydraulic fluid supplied to port 172b at line pressure mainly flows into port 172a, but it is partially discharged to port 172a. As a result, hydraulic pressure developed in port 172b is determined by the ratio of amount of incoming flow into this port to amount of discharging flow. Thus, leftward movement of spool 174 causes an increase in clearance disposed on the discharge side and a decrease in clearance disposed on the line pressure side, resulting in an increase in hydraulic pressure developed in port 172b. Usually, port 172d is supplied with line pressure applied to port 172c. Hydraulic pressure at port 172b is supplied via hydraulic fluid line 176 to driver pulley cylinder chamber 20, whereas hydraulic pressure at port 172d is supplied via hydraulic fluid line 179 to follower pulley cylinder chamber 32. As a result, leftward movement of spool 174 causes an increase in hydraulic pressure in driver pulley cylinder chamber 20, resulting in a decrease in width of V-shaped pulley groove of driver pulley 16, hand and an increase in width of V-shaped pulley groove of follower pulley 26. That is, this causes an increase in contact radius of driver pulley 16 with V-belt 24, and a decrease in contact radius of follower pulley 26 with V-belt 24, thus causing a decrease in reduction ratio. Rightward movement of spool 174 causes the reverse process to take place, thus causing an increase in reduction ratio.

Although, as mentioned before, lever 178 of shift operation mechanism 112 has middle portion thereof connected to spool 174 by pin 181 and has one end connected to the before mentioned bias member 158 by pin 183, the opposite end of lever 178 is connected to a rod 182 via a pin 185. Rod 182 is formed with a rack 182c that meshes with a pinion gear 110a of shift motor 110. With this shift operation mechanism 112, if pinion gear 110a of shift motor 110 that is subject to control of a shift control unit 300 is rotated in such a direction as to cause rod 182 to move to the right, this rightward movement of rod 182 causes lever 178 to swing about pin 183 clockwise, thus urging spool 174 of shift control valve 106 that is connected to lever 178 to move to the right. As described previously, this causes axially movable conical disc 22 of driver pulley 16 to move to the left, thus causing an increase in width of V-shaped pulley groove of driver pulley 16 and a decrease in V-shaped pulley groove of follower pulley 26, resulting in an increase in reduction ratio. Because one end of lever 178 is linked to bias member 158 via pin 183, the above mentioned movement of axially movable conical disk 22 causes bias member 158 to move to the left, and this leftward movement of bias member 158 causes lever 178 to swing about pin 185 disposed on the other end thereof clockwise. Thus, spool 174 is pulled back to the left, tending to cause a decrease in reduction ratio. In this process, spool 174, driver pulley 16, and follower pulley 26 are stablized in a reduction ratio providing state corresponding to the rotary position assumed by shift motor 110. If shift motor 110 is rotated in the opposite direction so as to urge rod 182 to the left, this leftward movement of rod 182 causes the associated members to move in a similar manner until they assume a reduction ratio state corresponding to a new rotary position of shift motor 110. (Rod 182 is movable beyond the position corresponding to the maximum reduction ratio and further to the right into an overstroke range activate a change-over detection switch 298, and the output signal of this detection switch is supplied, as an input, to shift control unit 300.) Therefore, if shift motor 110 is actuated in accordance with a predetermined pattern, the reduction ratio varies accordingly, so that it is possible to control shifting in the continuously variable transmission by controlling shift motor 110.

Shift motor 110 (which will be hereinafter called as "stepper motor") is so controlled as to assume a rotary position that is determined in correspondance with a pulse number signal determined in shift control unit 300. Shift control unit 300 gives pulse number signal in accordance with a predetermined shift pattern. Adjustment pressure change-over valve 108 has a valve element thereof formed integrally with rod 182 of shift operation mechanism 112. That is, adjustment pressure change-over valve 108 has a valve bore 186, formed within the valve body, that is provided with ports 186a, 186b, 186c, and 186d, and lands 182a and 182b formed on rod 182. Port 186a communicates with a hydraulic fluid line 188. Port 186b communicates with electromagnetically operated valve 118 via a hydraulic fluid line 190. Port 186c communicates with a hydraulic fluid line 189. port 186d is a drain port. Normally, port 186a and port 186b are allowed to communicate with each other via a space defined within the valve bore between lands 182a and 182b, but when rod 182 is displaced into the overstroke range beyond the maximum reduction ratio corresponding position, port 186a is closed and port 186b is allowed to communicate with port 186c.

Throttle valve 114 (clutch pressure regulator valve) has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198 that biases spool 194. When intake manifold vacuum is lower than a predetermined value, for example, 300 mmHg, (viz., when intake manifold vacuum is near the atmospheric level), vacuum diaphragm 198 biases spool 194 with a force that is in inverse proportion to the magnitude of vacuum, whereas when the intake manifold vacuum is higher than the predetermined value, it applies no force to spool 194. Port 192a is a drain port, ports 192b and 192d communicate with hydraulic fluid line 140 serving as throttle pressure circuit, port 192c communicates with hydraulic fluid line serving as line pressure circuit, port 192e is a drain port, and port 192g communicates with the before mentioned hydraulic fluid line 189. The inlets to ports 192b and 192g are provided with orifices 202 and 203, respectively. Spool 194 is subject to two forces directed to the left, one resulting from the fact that hydraulic fluid pressure applied to port 192g acts on a differential area between lands 194d and 194e and the other by vacuum diaphragm 198, and it is also subject to a force, directed to the right, resulting from the fact hydraulic fluid pressure applied to port 192b acts on a differential area between lands 194a and 194b. Throttle valve 114 effects well known pressure regulation until the above mentioned forces balance with each other by using line pressure applied to port 192c as pressure source and port 192e as a discharge port. As a result, a throttle pressure builds up at ports 192b and 192d which corresponds to the force due to hydraulic pressure applied to port 192g and the force due to vacuum diaphragm 198. Since, in the above mentioned manner, it is adjusted in accordance with engine manifold vacuum, throttle pressure corresponds to engine output torque. That is, if engine output torque becomes large, throttle pressure takes a high value accordingly. Throttle pressure is adjusted also by hydraulic fluid pressure (adjustment pressure) applied to port 192g which will be described later more in detail.

Constant pressure regulator valve 116 has a valve bore 204, formed in the valve body, that is provided with ports 204a, 204b, 204c, 204d, and 204e, a spool 206 having lands 206a and 206b, and a spring 208 biasing spool 206 to the left. Ports 204a and 204c communicate with a hydraulic fluid line 209. Port 204b communicates with hydraulic fluid line 132 serving as line pressure circuit. Ports 204d and 204e are drain ports. The inlet to port 204a is provided with an orifice 216. This constant pressure regulator valve 116 effects well known pressure regulation to provide constant hydraulic fluid pressure corresponding to the force of spring 208 in hydraulic fluid line 209. Hydraulic fluid line 209 is connected via a choke type throttle valve 250 with hydraulic fluid line 188 and it is connected via a choke type throttle valve 252 with hydraulic fluid line 189. Hydraulic fluid line 209 is provided with a filter 211.

Electromagnetically operated valve 118 is so constructed as to adjust the discharge, in amount, of hydraulic fluid from hydraulic fluid line 190 to a port 222 by a plunger 224a biased by a spring 225 toward a closed position where the discharge is prohibited under the control of a solenoid 224. Solenoid 224 is subject to pulse duty factor control by shift control unit 300. Since amount of hydraulic fluid discharged is in inverse proportion to amount of current passing through solenoid 224, hydraulic fluid pressure (adjustment pressure) is variable in inverse proportion to the amount of current passing through solenoid 224. When the vehicle comes to a halt and the engine begins to idle, rod 182 moves into the overstroke range and adjustment pressure change-over valve 108 assumes a position indicated by a lower half thereof as illustrated in FIGS. 1A and 1B where hydraulic fluid line 190 is allowed to communicate with hydraulic fluid line 189, allowing the adjustment pressure obtained by electromagnetically operated valve 118 to act on port 192g of throttle valve 114. This causes throttle pressure to be controllably varied such that forward clutch 40 or reverse brake 50 is kept at slightly engaged state. Until the vehicle is started, this adjusted throttle pressure is supplied to forward clutch 40 or reverse brake 50, thus providing a predetermined creep torque. Besides, shocks which would take place upon selecting D from N range or selecting R from N range are substantially suppressed. Immediately after the vehicle is started, throttle pressure is elevated and forward clutch 40 or reverse brake 50 is completely engaged. On ordinary running of the vehicle, adjustment pressure change-over valve 108 assumes a position indicated by an upper half thereof where hydraulic fluid line 190 is allowed to communicate with hydraulic fluid line 188, so that lock-up control valve 122 is shifted by the adjustment pressure as will be later described.

Coupling pressure regulator valve 120 has a valve bore 230, formed in the valve body, that is provided with ports 230a, 230b, 230c, 230d and 230e, a spool 232 having lands 232a and 232b, and a spring 234 biasing spool 232 to the left. Ports 230a and 230c communicate with a hydraulic fluid line 235, port 230b is supplied with hydraulic fluid from hydraulic fluid line 165 which is discharged by line pressure regulator valve 102, and ports 230d and 230e and drain ports. The inlet to port 230a is provided with an orifice 236. Coupling pressure regulator valve 120 effects pressure regulation using hydraulic fluid pressure applied to port 230b as a source of hydraulic pressure and provides a constant hydraulic fluid pressure (coupling pressure) corresponding to the force of spring 234. This hydraulic fluid pressure is supplied to hydraulic fluid line 235. This coupling pressure is used as a working pressure within fluid coupling 12, and it is also used to actuate the lock-up mechanism.

Lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. Ports 240a and 240g are drain ports, port 240b communicates with hydraulic fluid line 209, ports 240c and 240f communicate via hydraulic fluid line 243 with lock-up fluid chamber 12a, port 240d is connected with hydraulic fluid line 245 that communicates with fluid coupling 12. port 240e is supplied with constant coupling pressure from hydraulic fluid line 235. Port 240h is connected with the before mentioned hydraulic fluid line 188. The inlets to ports 240b, 240c, 240g, and 240h are provided with orifices 246, 247, 248, and 249, respectively. This lock-up control valve 122 controls the supply of hydraulic fluid pressure to fluid coupling 12 and that to lock-up fluid chamber 12a. Spool 242 shifts from one position to another position when the following three forces attain a predetermined relationship, one due to hydraulic fluid pressure (i.e., constant fluid pressure obtained after pressure regulation by constant pressure regulator valve 116) applied to port 240b which acts on a differential area between lands 242a and 242b, another due to hydraulic fluid pressure applied to port 240c which acts on a differential area between 242b and 242c, and the other due to hydraulic fluid pressure (i.e., adjustment pressure) applied to port 240h which acts on axial end of land 242e. When spool 242 assumes a lock-up position indicated by the upper half thereof, port 240f is allowed to communicate with port 240g via a space defined in the valve bore between lands 242d and 242e, thus allowing lock-up fluid chamber 12a to be drained via port 240g. In this lock-up position, port 240d is allowed to communicate with port 240e via a space defined in the valve bore between lands 242c and 242d, thus allowing the supply of coupling pressure generated by coupling pressure regulator valve 120 to the inside of fluid coupling 12 via fluid line 245. As a result, the lock-up mechanism assumes the lock-up state. Hydraulic fluid line 245 is provided with a relief valve 250 that prevents application of abnormally high pressure to fluid coupling 12. When, on the other hand, spool 242 assumes a release position indicated by the lower half thereof as illustrated in FIGS. 1A and 1B, port 240e is allowed to communicate with port 240f via a space defined within the valve bore between lands 242d and 242e, thus allowing the supply of coupling pressure to lock-up fluid chamber 12a via hydraulic fluid line 243. Port 240d, in this position, is sealed by lands 242c and 242d. As a result, the lock-up mechanism assumes the release state, thus providing a state where hydraulic fluid is supplied, as working fluid pressure, to the inside of fluid coupling 12 via lock-up fluid chamber 12a past clearance 12f (see FIG. 2). Hydraulic fluid pressure within fluid coupling 12 is kept at a constant value by means of a pressure maintaining valve 252. Hydraulic fluid discharged by pressure maintaining valve 252 is supplied via hydraulic fluid line 254 to a cooler 256 where it is cooled before used for lubrication. Hydraulic fluid line 254 is provided with a cooler pressure maintaining valve 258. Hydraulic fluid discharged by cooler pressure maintaining valve 258 returns via hydraulic fluid line 164 to intake port of hydraulic fluid pump 101. Hydraulic fluid line 254 leads to an area where bias member 158 is slidably engaged with the valve body to lubricate there. Hydraulic fluid line 254 is connected via an orifice 259 with hydraulic fluid line 235 to secure minimal supply of hydraulic fluid.

Hereinafter, the control unit 300 is described which controls actuation of stepper motor 110 and solenoid 224.

As shown in FIG. 3, input signals to the control unit 300 is include electric signals from an engine revolution speed sensor 301, a vehicle speed sensor 302, a throttle opening degree sensor 303, a shift position switch 304, a turbine revolution speed sensor 305, a change-over detection switch 298, an engine coolant temperature sensor 306, and a brake sensor 307. Engine revolution speed sensor 301 detects engine revolution speed by counting the number of engine ignition spark pulses, and vehicle speed sensor 302 detects vehicle speed by measuring rotation of the output shaft of the continuously variable transmission. Throttle opening sensor 303 detects engine throttle opening degree in terms of an electric voltage. Shift position switch 304 detects which of positions P, R, N, D, and L the before mentioned manual valve 104 assumes. Turbine revolution speed sensor 305 detects revolution speed of the turbine shaft of fluid coupling 12. Change-over detection switch 298 is turned ON when rod 182 of shift operation mechanism 112 moves further beyond the maximum reduction ratio corresponding position (i.e., when rod 182 is disposed in the overstroke range). Engine coolant temperature sensor 306 generates an output signal when engine coolant temperature is lower than a predetermined value. Brake sensor 307 detects whether vehicle brake is used. Output signals from engine revolution speed sensor 301, vehicle speed sensor 302, and turbine revolution speed sensor 305 are supplied via associated wave shapers 308 and 309 to an input interface 311. Electric voltage signal from throttle opening sensor 303 is converted into a diginal signal at an AD converter 310 before supplied to input interface 311. Shift control unit 300 comprises input interface 311, a CPU (central processor unit) 313, a reference pulse generator 312, a ROM (random access memory) 315, and an output interface 316. These elements are interconnected by an address bus 319 and a data bus 320. Reference pulse generator 312 generates reference pulse on which CPU 313 operates. What are stored in ROM 314 include a program for control of stepper motor 110 and control of solenoid 224. RAM 317 temporarily stores information from various sensors and switch and parameters necessary for control. Output signals of shift control unit 300 is supplied via output interface 316 and an amplifier 317 to stepper motor 110 and via input interface 316 to solenoid 224.

Referring to FIGS. 4 to 7, the flowchart of a control program to be executed by the control unit 300 is hereinafter explained.

The following table sets forth the meaning of characterstic address names used in connection with the flowchart shown in FIGS. 4 to 7.

| Address Name | Content |
| --- | --- |
| DUTY | duty factor for sol. 224. |
| TH | throttle opening degree. |
| V | vehicle speed. |
| Nt | turbine rev. speed. |
| Vn | vehicle speed obtained in the previous run. |
| Vd | rate of change in vehicle speed (acceleration). |
| THo | small throttle opening degree value. |
| FBR | quick brake state indicative flag. |
| Tb | timer value. |
| $P_A$ | pulse number indicative of actual position of stepper motor 110. |
| $P_H$ | pulse number $P_A$ upon detecting quick brake. |
| $N_E$ | engine rev. speed. |
| $N_D$ | difference $N_E - Nt$ (slip in fluid coupling 12) |
| $V_{ON}$ | lock-up ON vehicle speed. |
| $V_{OFF}$ | lock-up OFF vehicle speed. |
| LUF | lock-up indicative flag. |
| Nm1 | first target slip value. |
| $e_1$ | difference $N_D -$ Nm1. |
| No | threshold value in $N_D$ above which feedforward control is carried out, otherwise feedback control. |
| Ps | pulse number anticipated upon release of brake (i.e., Ps = $P_H -$ kTb). |
| $P_1$ | pulse number corresponding to the maximum reduction ratio (see FIG. 9). |
| $P_D$ | target pulse number. |
| FSPU | flag indicative of state where reduction ratio represented by Ps does not reach the maximum reduction ratio represented by $P_1$ (i.e., Ps is greater than $P_1$). |
| Nm2 | second target slip value. |
| $e_2$ | difference $N_D -$ Nm2. |

First of all, a shift position is read from shift position switch 304 (at step 502) and a decision is made whether the obtained shift position represents a running position, such as D, L, or R range, (at step 504). If the shift position does not represent such running position but it represents P or N range, a duty factor DUTY is set equal to 0% (at step 506) before going to step 630 later described. If the shift position obtained represents the running position, a throttle opening degree TH is read from throttle opening degree sensor 303 (at step 508) and a vehicle speed V from vehicle speed sensor 302 (at step 510), and a decision is made whether the vehicle speed V is not less than 10 km/h, i.e., V≧10 km/h, (at step 802). If the vehicle speed V is not less than 10 km/h, the program proceeds to step 512 bypassing steps 804, 806, 808, 810, 812, 816, 820, 822, 824, 826, 814 and 818. If the vehicle speed V is less than 10 km/h, a turbine revolution speed Nt is read from turbine revolution speed sensor 305 (at step 804), and a decision is made whether the turbine revolution speed Nt is not less than 600 rpm, i.e., Nt≧600 rpm (at step 806). If the turbine revolution speed Nt is not less than 600 rpm, the control proceeds to the before mentioned step 512, whereas if the turbine revolution speed Nt is less than 600 rpm, an equation $Vd=Vn-V$ is calculated (at step 808), where Vn: the vehicle speed obtained at previous run; V: the vehicle speed obtained at present run; and Vd: the rate of change in vehicle speed (i.e., deceleration). The vehicle speed V obtained in the present run is stored as Vn (at step 810). A decision is made whether the throttle opening degree TH obtained is not less than the value THo, i.e., TH≧THo, (at step 812). If the throttle opening degree TH is not less than the value THo, the quick brake state indicative flag FBR is set equal to 0 (at step 814), and then the control proceeds to step 512. If the throttle opening degree TH is less than a predetermined small throttle opening degree value THo, a decision is made whether the flag FBR is set equal to 1 (at step 816). If the flag FBR is set i.e., FRB=1, the timer value Tb is increased by 1 (at step 818) and then the control proceeds to the step 512. If the flag FBR is not set, i.e., FBR=0, (at step 816), a decision is made whether the rate of change in vehicle speed Vd is not less than a predetermined value Vdo i.e., Vd≧Vdo, (at step 820). If Vd is not less than Vdo (i.e., the vehicle is decelerating quickly), the flag FBR is set (at step 822), the timer value Tb is cleared to 0 (at step 824), and the actual pulse number $P_A$ is stored at the address $P_H$ (at step 826). If Vd is less than the value Vdo at step 820, the control proceeds to the step 512.

At the step 512, an engine revolution speed $N_E$ is read from engine revolution speed sensor 301 (at step 512). Then, a difference $N_D$ is determined by calculating $N_D=N_E-Nt$ (at step 516), and the lock-up ON vehicle speed $V_{ON}$ and the lock-up OFF vehicle speed $V_{OFF}$ are determined by table lock-up OFF vehicle speed $V_{OFF}$ are determined by table look-up of of FIG. 8 based on the vehicle speed V and throttle openind degree TH (at step 518). Subsequently, the control goes to step 520 where a decision is made whether the lock-up flag LUF is set, i.e., LUF=1. If the flag LUF is not set, i.e., LUF=0, a decision is made whether the vehicle speed V is greater than the lock-up ON vehicle speed $V_O$ (at step 522). If V is greater than $V_{ON}$, the difference e is determined by calculating $e=N_D-Nm1$ (at step 524). Then, a feedback control gain $G_1$ is determined by retrieval of stored data based on the difference e (at step 526). Then, the control goes to step 528 where a decision is made whether $N_D$ is less than a predetermined small threshold value No. This value No is a difference in revolution speed above which the feedforward control is carried out, otherwise feedback control is carried out. If $N_D$ is less than No, the duty factor DUTY is increased by $\alpha$%, alpha %, (at step 530), and a decision is made whether DUTY is less than 100% (a step 532). If DUTY is less than 100%, the control proceeds to step 840 (see FIG. 6). If DUTY is not less than 100%, the DUTY is set equal to 100% (at step 534), and the lock-up flag LUF is set (at step 536), and then the control proceeds to the step 840. Thus, the feedforward control is carried out. If, at the step 528, $N_D$ is not less than No, the duty factory DUTY is determined as a function of e and $G_1$ (at step 538). Thus, the feedback control is carried out. If, at the step 522, V is not greater than $V_{ON}$, the duty factory DUTY is set equal to 0% (at step 540), and then the lock-up flag is cleared to 0 (at step 542). As a result, the lock-up mechanism is released. If, at the step 520, the lock-up flag LUF is set, a decision is made whether the vehicle speed V is less than the lock-up OFF vehicle speed $V_{OFF}$ (at step 544). If V is less than $V_{OFF}$, the control proceeds to step 540 where the duty factor DUTY is set equal to 0%, and then to step 542 where the lock-up flag LUF is cleared. As a resul, the lock-up state is released. If V is not less than $V_{OFF}$ (at step 544), the duty factor DUTY is set equal to 100% (at step 546). As a result, the lock-up state is maintained.

Figure 6:
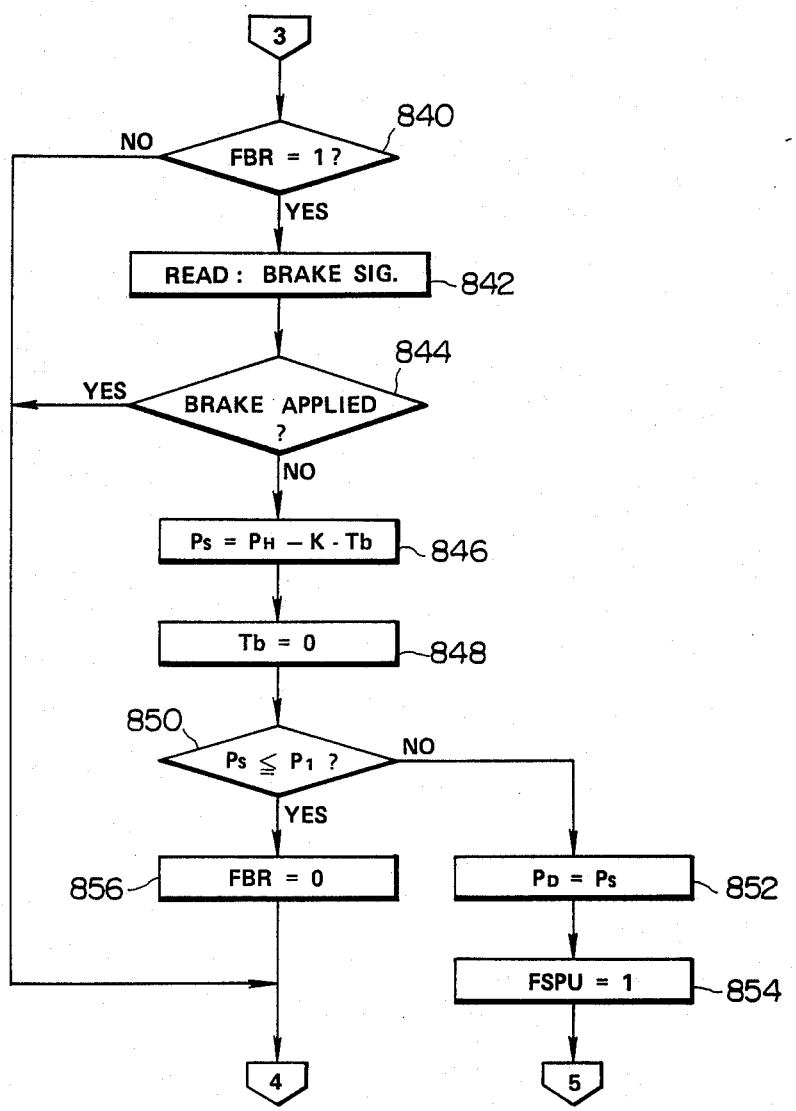

Referring to FIG. 6, a decision is made whether the quick brake state indicative flag FRB is set equal to 1 (at step 840). If the flag FBR is not set, the control proceeds to step 602 (see FIG. 7), whereas if the flag FBR is set, a brake signal is read from brake sensor 307 (at step 842). Then, a decision is made based on the brake signal whether the brake pedal is depressed (at step 844). If the brake pedal is depressed, the control proceeds to step 602, whereas if the brake is released, the pulse number Ps is anticipated by calculating the equation $Ps=P_H-kTb$ (at step 846). Then, the timer value Tb is cleared to 0 (at step 848), and a decision is made whether the value Ps is not greater than the value $P_1$, i.e., Ps≦$P_1$, (at step 850). If Ps is greater than $P_1$, i.e., the reduction ratio represented by Ps does not yet reach the maximum reduction ratio represented by $P_1$, the target $P_D$ is set equal to Ps, and the flag FSPU is set equal to 1 (at step 854), and then the control proceeds to step 630 (see FIG. 7). If, at the step 850, Ps is not greater than $P_1$, i.e., the reduction ratio has reached to maximum reduction ratio, the flag FBR is cleared to 0 (at step 856), and then the control proceeds to step 602.

Figure 7:
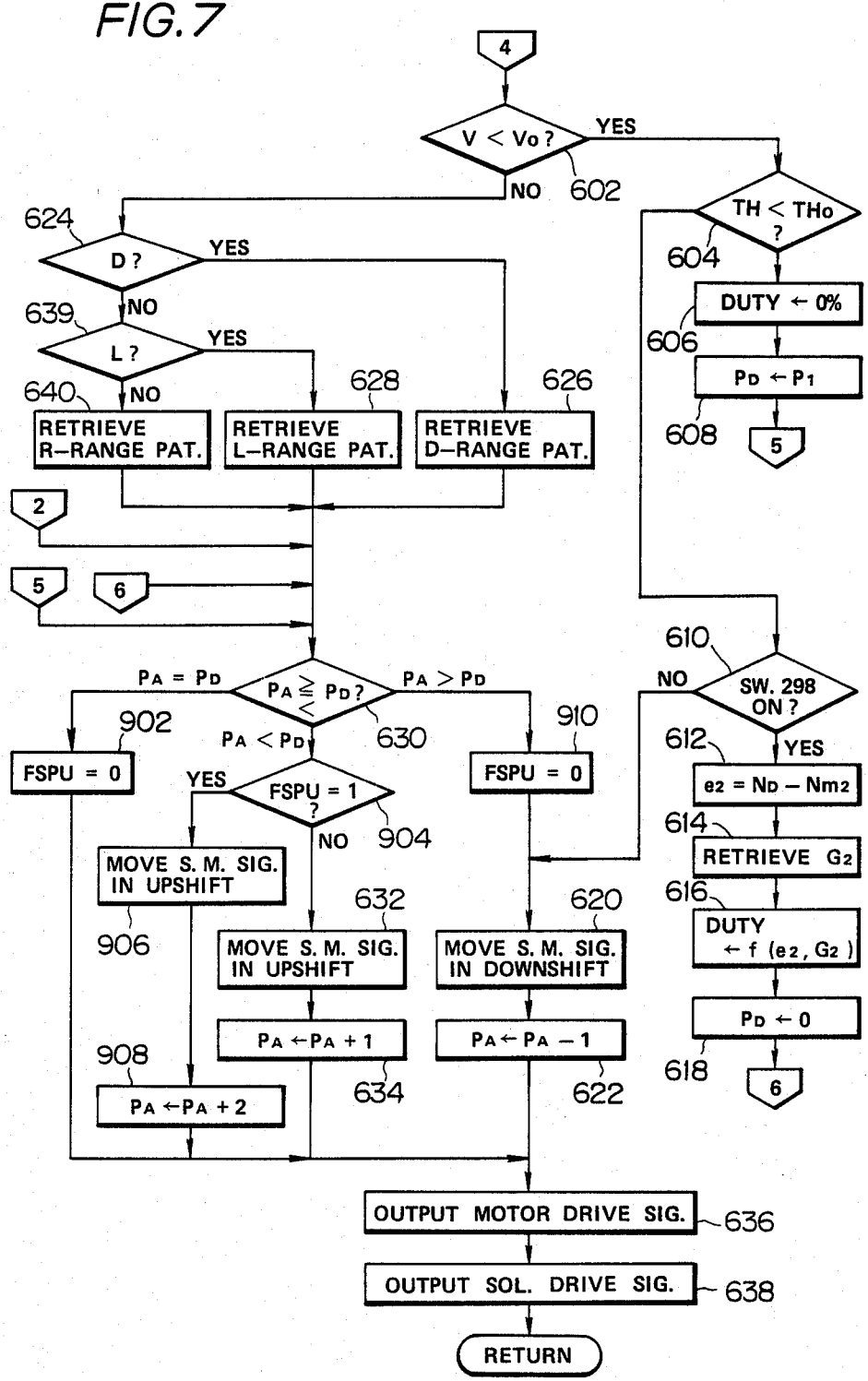
Figure 8:
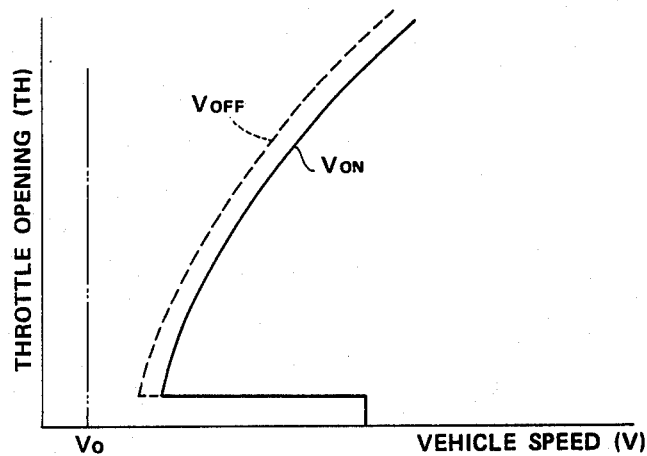
FIG. 8 is a graph showing variation in lock-up ON vehicle speed and lock-up OFF vehicle speed.
Figure 9:
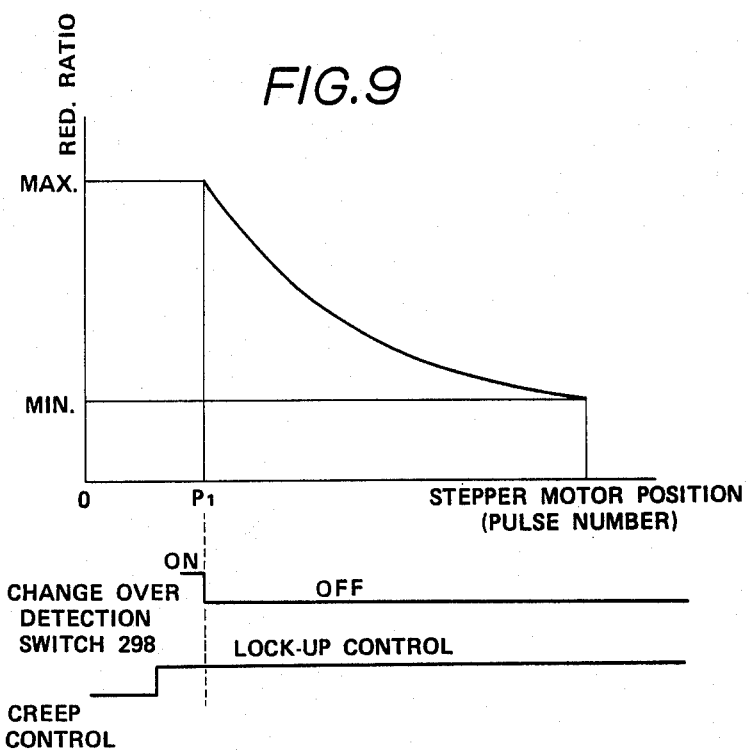
FIG. 9 is a graph showing reduction ratio vs., stepper motor position.

From step 840, 844, or 856, the control may proceed to step 602. Referring to FIG. 7, a decision is made whether the vehicle speed V is less than a predetermined small value $V_0$ (at step 602). As shown in FIG. 8, the value $V_0$ ranges from 2 to 3 km/h which is lower than the lock-up ON and OFF vehicle speeds $V_{ON}$ and $V_{OFF}$. If V is less than $V_0$, the creep control is carried out, whereas if V is not lower than $V_0$, the shift control is carried out. If V is lower $V_0$, a decision is made whether TH is less than a predetermined small value $TH_0$ (at step 604). When TH is not less than $TH_0$, i.e., when the throttle is not at the idle position, DUTY is set equal to 0% (at step 606), and the target pulse number $P_D$ is set equal to the pulse number $P_1$ (at step 608). As shown in FIG. 9, the pulse number $P_1$ is indicative of the operating position of the stepper motor 110 which corresponds to the maximum reduction ratio. That is, the operating position of stepper motor 110 determined by this pulse number $P_1$ is a boundary between shift control range and overstroke range. After step 608, the control proceeds to step 630, initiating such a control as to bring actual position of stepper motor 110 into agreement with the position designated by the pulse number $P_1$. If, at step 604, TH is less than $TH_0$, i.e., the throttle takes the idle speed position, a decision is made whether change-over detection switch 298 is 0 (at step 610). If the change-over detection switch 298 is ON, a difference $e_2$ is determined by calculating the equation $e_2=N_D-Nm2$ (at step 612), a feedback gain $G_2$ is determined by retrieval based on the difference $e_2$ (at step 614). The duty factory DUTY is determined as a function of $e_2$ and $G_2$ (at step 616). Then, $P_D$ is set equal to 0 (at step 618) and the control proceeds to step 630. If, at the step 610, the detection switch 298 is OFF, the stepper motor drive signal is shifted in a downshift direction (at step 620), and the pulse number $P_A$ is decreased by the value 1 (at step 622) before the stepper motor drive signal is outputted (at step 636) and the solenoid drive signal is outputted (at step 638).

If, at the step 602, the vehicle speed V is not lower than $V_0$, a decision is made whether the shift position is D range (at step 624). If the shift position is D range, D-range shift pattern is retrieved (at step 626). If the shift position is not D range and it is L range (at step 639), L-range shift pattern is retrieved (at step 628). If, at step 639, it is decided that shift position is not L range, R-range shift pattern is retrieved (at step 640). As a result of the process at each of the retrieval steps, the target pulse number $P_D$ is determined. Then, the pulse number $P_A$ is compared with the target pulse number $P_D$ (at step 630). If $P_D$ is equal to $P_A$, the flag FSPU is cleared to 0 and the control proceeds to steps 636 and 638 where the stepper motor drive signal and solenoid drive signal are outputted. If $P_A$ is less than $P_D$, a decision is made whether the flag FSPU is set (at step 904). If the flag FSPU is set, the stepper motor drive signal is moved in an upshift direction (at 906) and the pulse number $P_A$ is increased by the value 2 (at step 908) before the motor drive signal before the stepper motor drive signal and solenoid drive signal are outputted at steps 636 and 638. If, at the step 904, the flag FSPU is not set or cleared to 0, the stepper motor drive signal is moved in the upshift direction (at step 632) and the pulse number $P_A$ is increased by the value 1 (at step 634) before the stepper motor drive signal and solenoid drive signal are outputted at steps 636 and 638. If, at the step 630, the pulse number $P_A$ is greater than the target pulse number $P_D$, the flag FSPU is cleared to 0 (at step 910), the stepper motor drive signal is moved in a downshift direction (at step 620), the pulse number $P_A$ is decreased by the value 1 (at step 622) before the stepper motor drive signal and solenoid drive signal are outputted at steps 636 and 638. For better understanding of stepper motor control using the actual pulse number and stepper motor drive signal, reference should be made to U.S. Pat. No. 4,597,308 (EP counterpart: EP publication No. 0092228, published on Oct. 26, 1983). This U.S. patent discloses a lock-up control using an electromagnetic valve employing a solenoid, too.

The following control result from processing along the above mentioned steps 602 to 638. When the vehicle speed is very low with the throttle at idle speed position and the change-over switch 298 is ON, the torque transmission capacity of the forward clutch 40 is controlled by the solenoid 224 such that the slip within the fluid coupling 12 is kept at a predetermined value (creep control, see steps 612 to 618). When the throttle is not at the idle speed position although the vehicle speed is very low, the stepper motor 110 is moved to the maximum reduction corresponding position represented by the pulse number $P_1$, so the execution of lock-up control is ready to start immediately. In the above mentioned manner, with the throttle pressure adequately controlled, the torque transmission capacity of the forward clutch 40 is controlled during running at low vehicle speed with the engine idling such that the vehicle can run gradually at a creep speed. Under the other conditions, shifting in reduction ratio is effected by the stepper motor 110 in accordance with a predetermined shift pattern.

We, now, consider the case where a quick brake is applied on the driving wheels such that the driving wheels are locked, and subsequently the brake is released and the accelerator pedal is depressed to open the throttle from its idle speed position.

If the vehicle decelerates rapidly owing to the application of quick brake, the flag FBR is set, the timer value Tb is cleared, and $P_H$ is set equal to the pulse number $P_A$ stored upon detecting the application of quick brake (a flow along steps 820, 822, 824 and 826). In the next run, the control proceeds from step 816 to step 818 where the timer value Tb is increased by the value 1. Thus, the increment of the timer value Tb continues as long as the quick brake is kept applied. Under this condition, since the vehicle speed V obtained is very small so that the stepper motor drive signal is moved in the downshift direction to give instructions to stepper motor 110 to rotate to displace the shift control valve 106 in such a direction as to increase the reduction ratio, initiating quick discharge of hydraulic fluid from the driver pulley cylinder chamber 20. In response to a drop in hydraulic fluid pressure due to the discharge of hydraulic fluid from the driver pulley cylinder chamber 20, the driver pulley 16 and follower pulley 26 starts shifting toward a state where the increased reduction ratio is established. If, in this state, the application of brake is released, the pulse number Ps is determined by subtracting the product of the constant k with the timer value Tb stored at the release of brake from the pulse number $P_H$, i.e., $Ps = P_H - kTb$, (steps 844 and 846). The thus determined pulse number Ps is placed as the target pulse number $P_D$ (at step 852). Since the position of the stepper motor 110 is controlled such that $P_A$ becomes equal to $P_D$, the stepper motor 110 will rotate to the position corresponding to the pulse number Ps. The reduction ratio represented by the pulse number Ps corresponds to the actual reduction ratio established by the driver pulley 16 and follower pulley 26. This is because the actual state established by the driver pulley 15 and follower pulley 26 can be anticipated by calculating the equation carried out by the step 846 based on the elapsed time from application of quick brake since it has been confirmed by experiments that, in the case where the driver pulley 16 and follower pulley 26 do not rotate, the displacement speed at which the conical disks 22 and 34 is substantially constant. In accordance with the rotation of the stepper motor 110, the shift control valve 106 moves to adjust hydraulic pressure supplied to the driver pulley 16 so that the conical disk 22 assumes the state corresponding to what is represented by Ps. As a result, the V-belt 24 is tensioned between the driver and follower pulleys 16 and 26. Thus, if, in this state, the accelerator pedal is depressed to open the throttle, the V-belt can transmit torque without any delay. Since the reduction ratio established substantially reflects the operating conditions in this state, the transmission will not upshift toward a small reduction ratio on opening of the throttle, thus establishing driving state swiftly. The control as discussed above is carried out during running at low vehicle speeds where the wheels tend to be locked upon application of brake (see steps 802 and 806). On carrying out the control as above, the speed at which the stepper motor 110 is rotated in the upshift direction is two times the speed at which it is normally rotated in the same direction (see step 854 and a flow along steps 904, 906 and 908).

Figure 10:
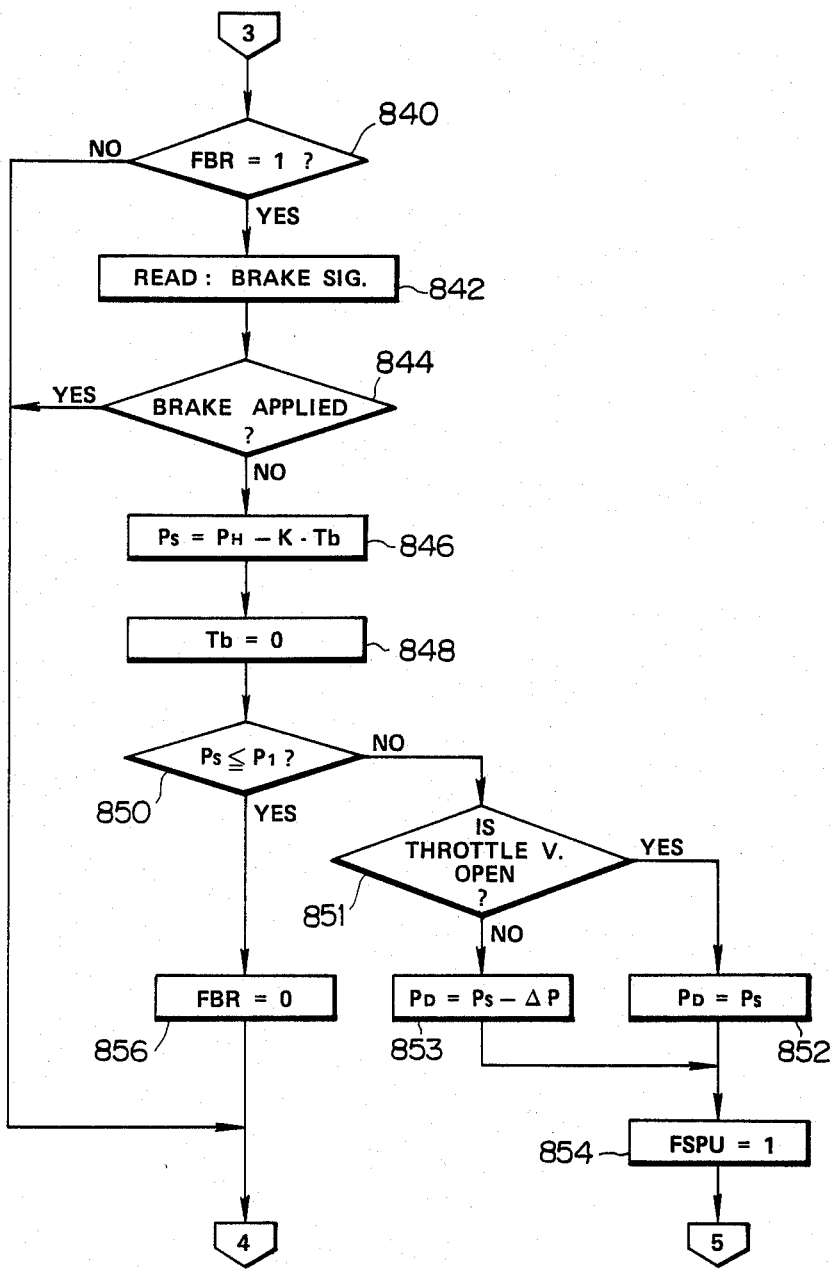
FIG. 10 is a flowchart showing modified portion of the flowchart illustrated by FIGS. 4 to 7.

Referring to FIG. 10, second embodiment is hereinafter described.

This second embodiment is different from the first embodiment only in the provision of new steps 851 and 853 between steps 850 and 854. At step 851, a decision is made whether thr throttle is open. If the throttle is not open, $P_D$ is determined by subtracting a predetermined value $\Delta P$ from the value Ps (at step 853), and then the control proceeds to step 854. If the throttle is open, $P_D$ is set equal to Ps (at step 852), and then the control proceeds to step 854. As a result, the stepper motor 110 rotates to a position disposed on larger reduction ratio side beyond a position corresponding to the state of the pulleys by a value corresponding to $\Delta P$ upon releasing of application of brake. Subsequently, the stepper motor 110 rotates to the position corresponding to the state of the pulleys when the throttle opens. There is a time after the brake has been released until the throttle is opened and the vehicle wheels are allowed to rotate during this time so that the shift response characteristic resumes. What is intended is therefore to shift the pulleys toward the larger reduction ratio side during this time by rotating the stepper motor 110 and thus shifting the shift control valve 106 toward the larger reduction ratiop side in order to improve the response characteristic to shift demand. Besides, since the stepper motor 110 has been already rotated to a position near the final target rotary position, the stepper motor 110 can quickly move to the position corresponding to the position assumed by the conical disk 22 of the driver pulley 16 immediately upon opening of the throttle.

Referring back to FIGS. 1A and 1B, application of excessive hydraulic pressure to the driver pulley cylinder chamber 20 which might occur when the above mentioned control is carried out is prevented by the provision of a relief valve 255 communicating with the hydraulic fluid line 176 connected to the cylinder chamber 20. Explaining in detail, if the stepper motor 110 id rotated quickly toward the smaller reduction ratio side after releasing the brake, the spool 174 of the shift control valve 106 moves quickly toward the smaller reduction ratio side, allowing the line pressure to be applied directly to the driver pulley cylinder chamber 20. Since, under this condition, the driver pulley 16 and follower pulley 26 are not rotating, there occurs no feedback via the link 178 responsive to the reduction ratio, and thus the spool 174 allows the direct application of line pressure to the cylinder chamber 20 without providing any fluid flow restriction. However, since the relief valve 255 is provided, the hydraulic fluid pressure within the driver pulley cylinder chamber 20 is prevented from exceeding a predetermined value. Thus, the application of excessive tension on the V-belt 24 is prevented which would be caused if the excessive hydraulic pressure builds up within the driver pulley cylinder chamber 20. The setting of the predetermined value of the relief valve 255 should be determined such that the hydraulic fluid pressure within the driver pulley cylinder chamber can increase slightly above the maximum hydraulic fluid pressure necessary for shifting operation.

Third embodiment is described hereinafter referring to FIGS. 11 to 14. The flowchart shown in FIGS. 11 to 14 are similar in many respects to the flowchart shown in FIGS. 4 to 7 so that the same reference numerals are used to designate like steps.

Figure 4:
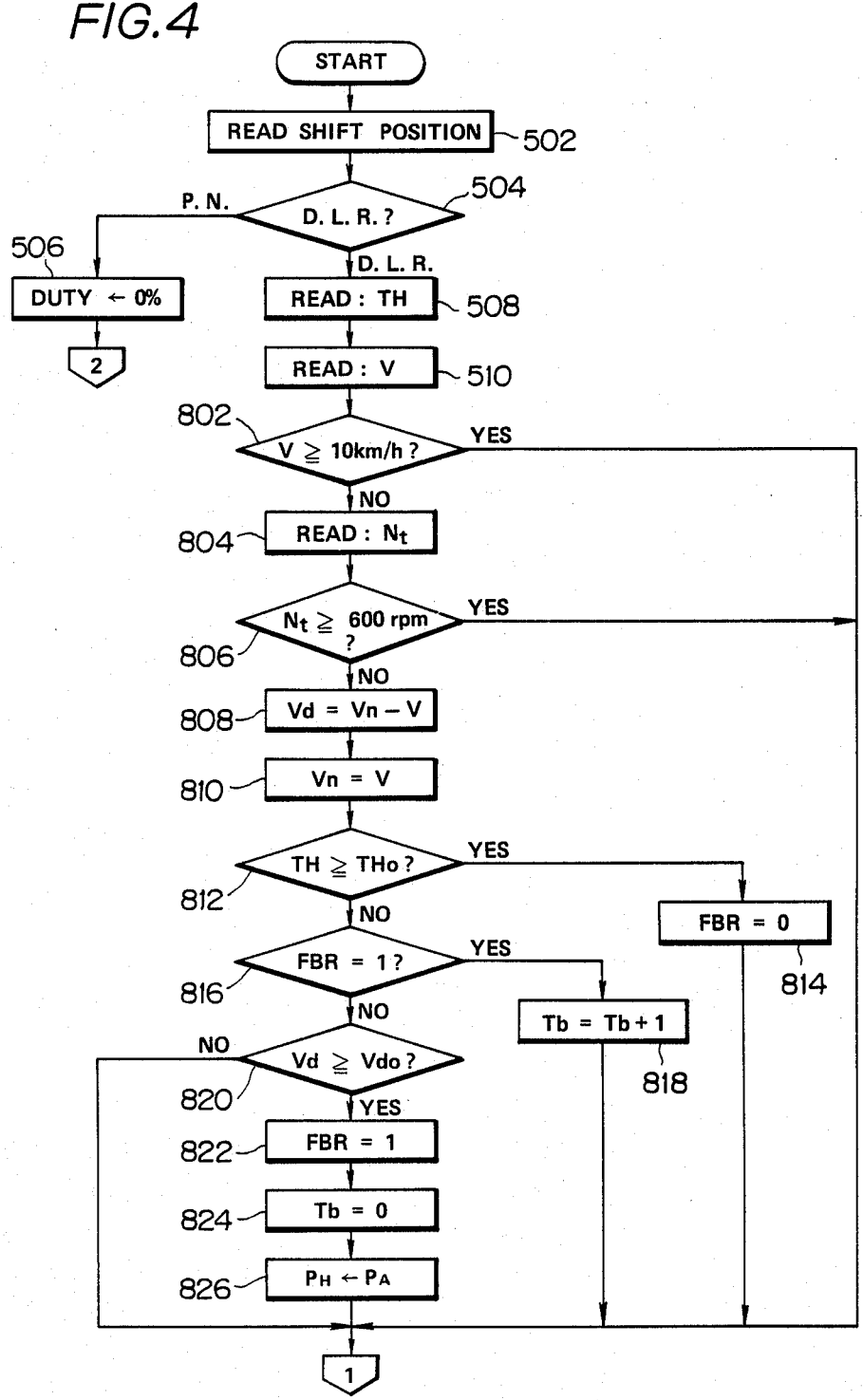
FIGS. 4 to 7, when combined, illustrate a flowchart.
Figure 11:
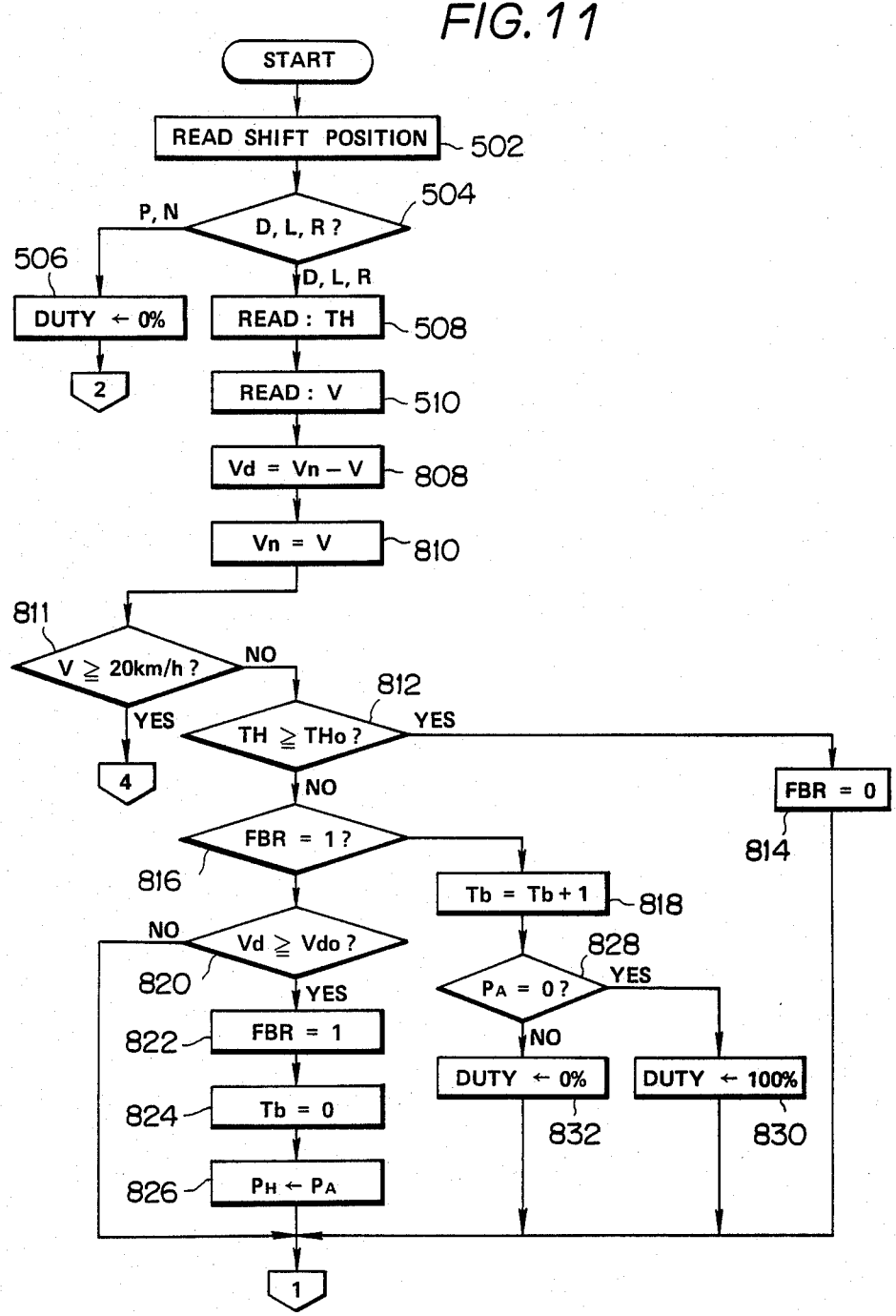

Comparing FIG. 11 with FIG. 4 reveals that in FIG. 11 steps 802, 804 and 806 are not provided between steps 510 and 808, a new step 811 is provided between steps 810 and 812, and three new steps 828, 830 and 832 are provided after step 818. At step 811, a decision is made whether the vehicle speed V is not less than 20 km/h. If V is not less than 20 km/h, the control proceeds to step 602 shown in FIG. 14, whereas if V is less than 20 km/h, a decision is made whether TH is not less than THo (at step 812). If TH is less than THo, a decision is made whether the flag FBR is set (at step 816). If the flag FBR is set, the timer value Tb is increased by the value 1 (at step 818), and a decision is made whether $P_A$ is equal to 0 (at step 828). If $P_A=0$, the duty factor DUTY is set equal to 100% (at step 830), whereas if $P_A$ is greater than 0, the duty factor DUTY is set equal to 0%. As a result, if the vehicle speed is low (i.e., V is less than 20 km/h), quick brake is being applied (i.e., FBR=1), and the stepper motor 110 assumes the maximum reduction ratio position to cause the adjustment pressure change-over valve 108 to assume the position as indicated by the lower half thereof as viewed in FIG. 1A ($P_A=0$), the duty factor for the solenoid 224 is set equal to 100%, draining hydraulic fluid from the fluid line 189 leading to the port 192g of the throttle valve 114, causing a drop in throttle pressure supplied to the forward clutch 40 via the fluid lines 140 and 142. This causes the forward clutch 40 to be released, interrupting application of the reverse drive power from the wheels, thus allowing the engine to operate at its idle speed. Since the idle operation of the engine is assured, the operation of the pump 101 is assured such that the necessary amount of hydraulic fluid is discharged. As a result, the line pressure with sufficiently large magnitude is generated, and this line pressure is supplied to the follower pulley cylinder chamber 32, making possible a quick movement of the pulleys 16 and 26 toward the larger reduction ratio side. If the engine is provided with an idle speed control device, it is possible to increase the discharge amount of hydraulic fluid by activating the idle speed control device to increase the engine speed at a step following the step 830.

Figure 5:
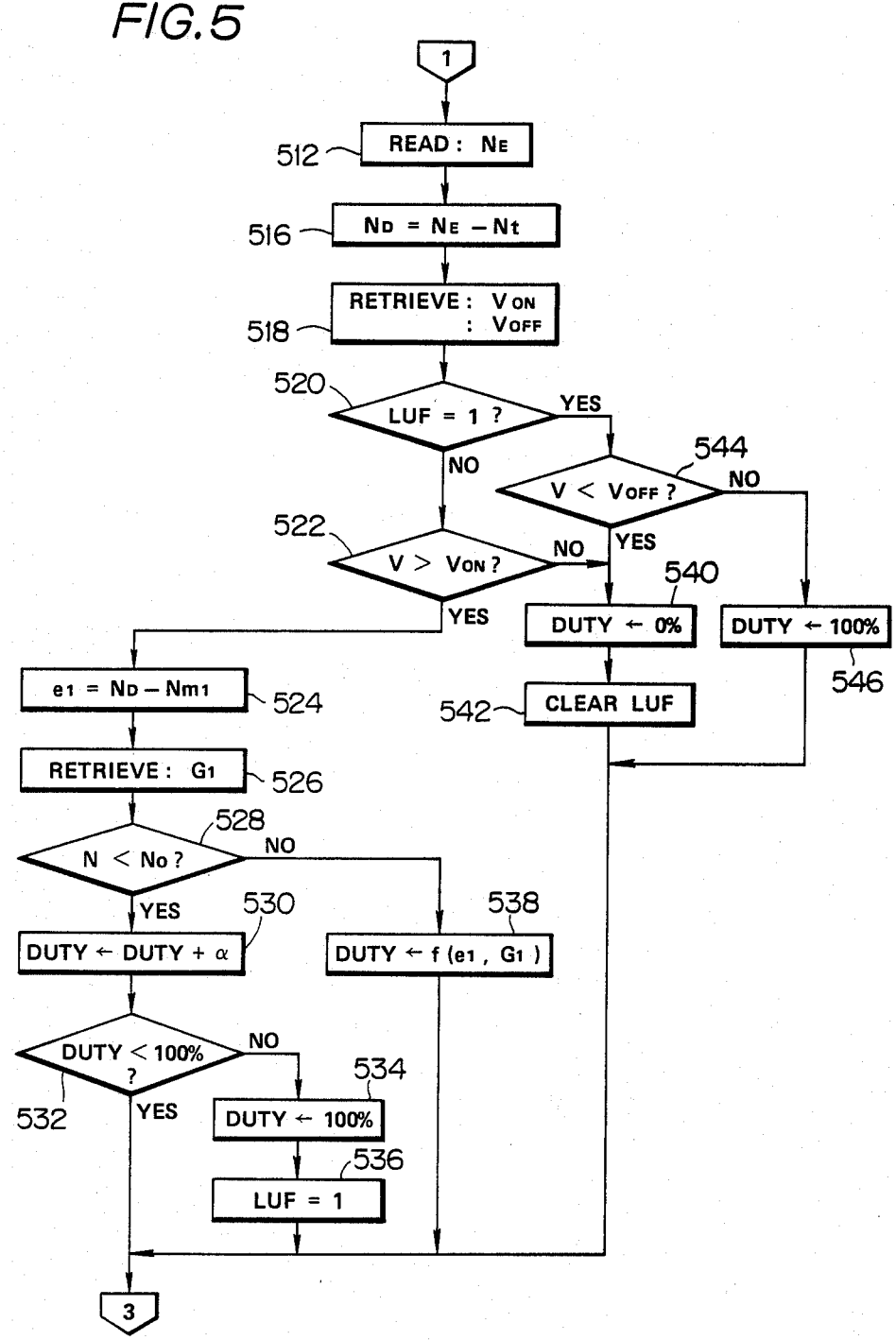
Figure 12:
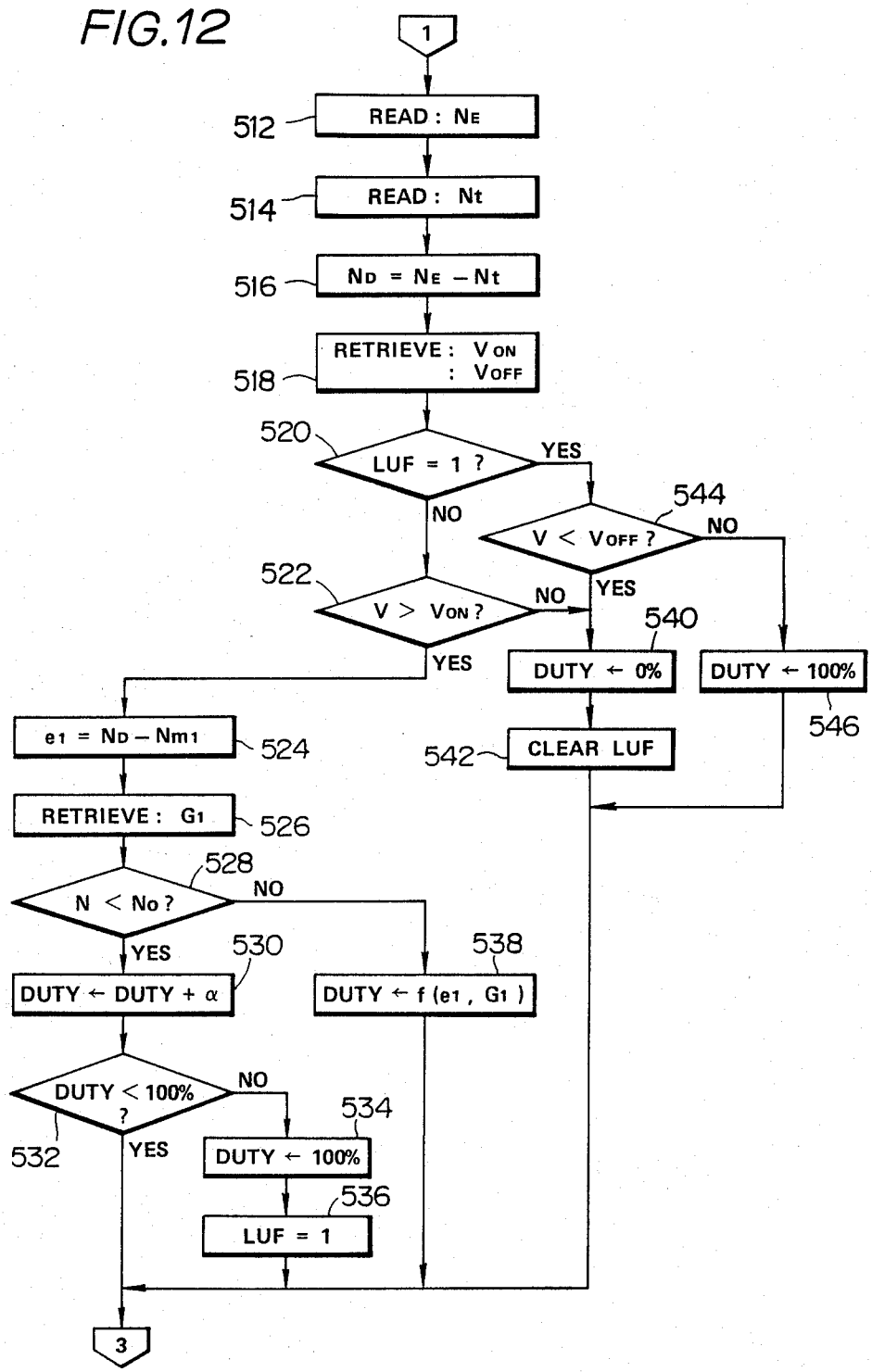

Comparing FIG. 12 with FIG. 5 reveals that the former is different from the latter only in the provision of a new step 514 between steps 512 and 516.

Figure 14:
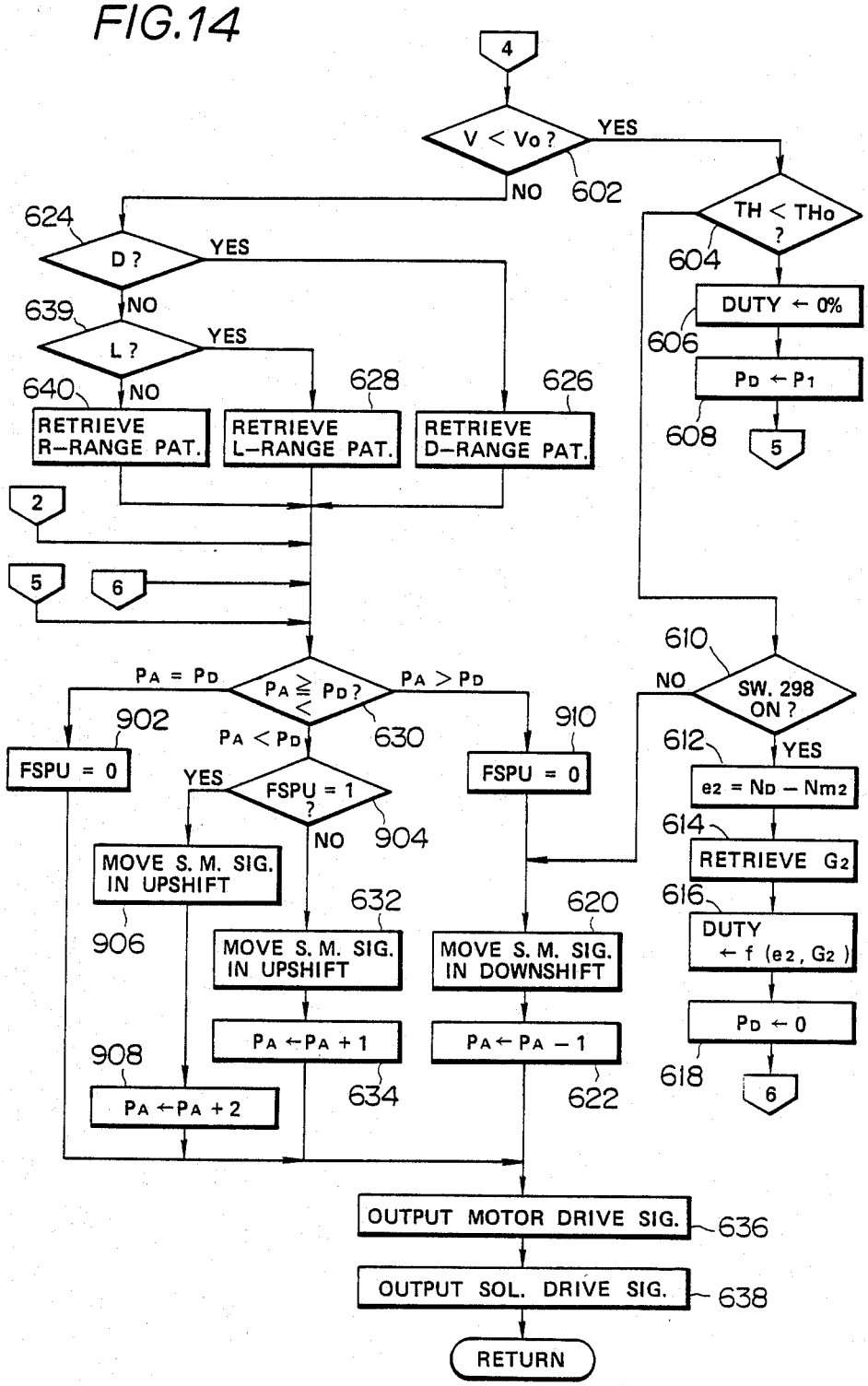

Referring to FIG. 13, a decision is made whether the flag FBR is set equal to 1 (at step 84)). If the flag FBR is not set equal to 1, the control proceeds to step 602 (see FIG. 14), whereas if the flag FBR is set equal to 1, Ps is determined by calculating the equation $Ps = P_H - kTb$ (at step 841), and a brake signal is read from the brake sensor 307 (at step 842), and then a decision is made whether the brake pedal is depressed (at step 844). If the brake is not applied, a decision is made whether Ps is not greater than $P_1$ (at step 850). If Ps is greater than $P_1$, the target pulse number $P_D$ is set equal to Ps (at step 852), and the flag FSPU is set equal to 1 (at step 854) before going to step 630 (FIG. 14). If, at the step 850, Ps is not greater than $P_1$, Tb is cleared (at step 855), and the flag FBR is cleared (at step 856) before going to step 602 (see FIG. 14). If, at step 844, the brake is applied, a decision s made whether the throttle is open (at step 846). If the throttle is open, the control proceeds along the step 850 and its following steps. If, at step 845, the throttle is not open, the target pulse number $P_D$ is set equal to the result from subtracing a predetermined value $\Delta P$ from the value Ps (at step 847), and then the control proceeds to step 630 (see FIG. 14). Alternatively, the step 841 may be disposed between steps 844 and 845 or between steps 845 and 847 rather than between steps 840 and 842.

Referring to FIG. 14, this Figure is the same as FIG. 7. Thus description of FIG. 14 is hereby omitted.

Referring back to FIG. 13, if the flag FBR is set equal to 1, Ps is set equal to the result from subtracting the product kTb from $P_H$, and the target pulse number $P_D$ is set equal to the result from subtracting the predetermined value $\Delta P$ from Ps (a flow along step 841, 842, 844, 845, and 847). The actual position of the stepper motor 110 is adjusted to a position indicated by the target pulse number $P_D$. Thus, the stepper motor 110 is rotated to a position corresponding to $Ps - \Delta P$. Since what is indicated by Ps is a reduction ratio established by the driver pulley 16 and follower pulley 26, what is indicated by $Ps - \Delta P$ is a position disposed on the larger reduction ratio side of the position corresponding to Ps by a value corresponding to $\Delta P$. This means that the stepper motor 110 rotates in response to movement of the driver and follower pulleys 16 and 26 toward the larger reduction ratio side, keeping its rotary position displaced toward the larger reduction ratio side by a small amount from a position corresponding to the position assumed by the pulley 16 and 26 during such movement. In accordance with such rotation of the stepper motor 110, the spool 174 of the shift control valve 106 moves so that the spool 174 always assume a position displaced toward the larger reduction ratio side (to the right as viewed in FIG. 1B) by an amount corresponding to the value $\Delta P$ from a position that corresponds to the position assumed by the driver pulley 16. Thus, the port 172b communicating with the driver pulley cylinder chamber 20 is kept open such that the discharge of hydraulic fluid from the driver pulley cylinder chamber 20 is not restricted. This allows the driver pulley 16 to move quickly, providing the highest shift response.

If, in this state, the application of the brake is released, $P_D$ is set equal to Ps (a flow along step 844, 850, and 852), the stepper motor 110 rotates and the shift control valve 106 moves accordingly to establish a state where the appropriate hydraulic fluid pressure is supplied to the driver pulley cylinder chamber 20 to keep the V-belt 24 tensioned between the pulleys 16 and 26. Thus, the pulleys 16 and 26 can transmit drive power immediately after the throttle is opened.

What is claimed is:

1. A control system for a continuously variable transmission for a vehicle including an engine with a throttle valve which opens in degrees, the continuously variable transmission including a hydraulically operated driver pulley, a follower pulley, a transmission V-belt tensioned between the driver and follower pulleys, and means, including a shift actuator and a shift control valve, for hydraulically controlling a reduction ratio between the driver and follower pulleys, said control system comprising:
    means for estimating a position which the driver and driven pulleys shall take upon release of a predetermined brake state of the vehicle after initiation of said predetermined brake state of the vehicle; and
    means for driving the shift actuator toward a position thereof corresponding to said position estimated by said estimating means when a predetermined condition is satisfied after the initiation of said predetermined brake state of the vehicle.

2. A control system as claimed in claim 1, wherein said predetermined condition is satisfied upon the release of said predetermined brake state of the vehicle.

3. A control system as claimed in claim 2, wherein said driving means starts driving the shift actuator to said position thereof corresponding to said position estimated by said estimating means upon the release of said predetermined brake state of the vehicle.

4. A control system as claimed in claim 2, wherein said estimating means effects an arithmetic operation based on a position which the shift actuator takes upon the initiation of said predetermined brake state of the vehicle and a time elapsed from the initiation of said predetermined brake state to the release thereof.

5. A control system as claimed in claim 2, wherein after said predetermined condition has been satisfied, said driving means drives the shift actuator at a speed higher than a speed at which the shift actuator was driven after the initiation of said predetermined brake state of the vehicle.

6. A control system as claimed in claim 2 including a relief valve provided to communicate with a hydraulic fluid supply line from the shift control valve to the driver pulley.

7. A control system as claimed in claim 2, wherein said driving means starts driving the shift actuator to a second position thereof displaced from said position thereof corresponding to said position estimated by said estimating means upon the release of said predetermined brake state of the vehicle, and then drives the shift actuator to said position thereof corresponding to said position estimated by said estimating means upon subsequent opening of the throttle valve.

8. A control system as claimed in claim 1, wherein said predetermined condition is satisfied upon the initiation of said predetermined brake state.

9. A control system as claimed in claim 1, wherein said predetermined condition is satisfied upon subsequent opening of the throttle valve after the release of said predetermined brake state of the vehicle, and wherein said driving means starts driving the shift actuator to a second position thereof displaced from said position thereof corresponding to said position estimated by said estimating means till the subsequent opening of the throttle valve after the release of said predetermined brake state of the vehicle, and then drives said shift actuator to said position estimated by said estimating means upon the subsequent opening of the throttle valve.

10. A control method for a continuously variable transmission for a vehicle including an engine with a throttle valve which opens in degrees, the continuously variable transmission including a hydraulically operated driver pulley, a follower pulley, a transmission V-belt tensioned between the driver and follower pulleys, and means, including a shift actuator and a shift control valve, for hydraulically controlling a reduction ratio between the driver and follower pulleys, said control method comprising the steps of:
    estimating a position which the driver and driven pulleys shall take upon release of a predetermined brake state of the vehicle after initiation of said predetermined brake state of the vehicle; and
    driving the shift actuator toward a position thereof corresponding to said position estimated by said estimating step when a predetermined condition is satisfied after the initiation of said predetermined brake state of the vehicle.

11. In a vehicle including an engine with a throttle valve which opens in degrees, a continuously variable transmission, and a brake, the continuously variable transmission including a driver pulley, a follower pulley, a transmission V-belt drivingly connected between the driver and follower pulleys and a transmission output shaft drivingly connected to the follower pulley, vehicle speed sensor means for measuring rotation of the transmission output shaft to detect a vehicle speed of the vehicle and generating a vehicle speed indicative signal indicative of the rotation of the transmission output shaft measured, throttle opening sensor means for detecting an opening degree of the throttle valve and generating a throttle opening degree indicative signal indicative of the opening degree of the throttle valve detected, a method of controlling a reduction ratio between the driver and follower pulleys, said method comprising the steps of:

determining responsive to the vehicle speed indicative signal and throttle opening degree indicative signal a first position which the shift actuator is scheduled to take;

estimating a second position which the shift actuator shall take after initiation of a predetermined brake state of the vehicle regardless of the vehicle speed indicative signal and throttle opening degree indicative signal;

setting normally said first position as a desired position but setting said second position a said desired position when a predetermined condition is satisfied after the initiation of said predetermined brake state of the vehicle; and driving the shift actuator toward said desired shift position thereof.

12. The method as claimed in claim 11, wherein said estimated step comprises a step of detecting an actual position of the shift actuator at the initiation of said predetermined brake state of the vehicle, a step of counting a time elapsed from the initiation of said predetermined brake state, and a step of calculating a predetermined equation involving as variables said actual position detected and said time counted upon subsequent release of said predetermined brake state of the vehicle to give a result as said second position.

13. The method as claimed in claim 12, wherein said predetermined condition is satisfied upon the subsequent release of said predetermined brake state of the vehicle.

14. The method as claimed in claim 12, wherein said estimating step comprises a step of varying said second position given by said calculating step by a predetermined value to give a third position, and wherein said setting step comprises a step of setting said third position as said desired position after the subsequent release of said predetermined brake state of the vehicle as long as said predetermined condition fails to be satisfied.

15. The method as claimed in claim 14, wherein said predetermined condition is satisfied upon subsequent opening of the throttle valve after the release of said predetermined brake state of the vehicle.

16. The method as claimed in claim 11, wherein said estimating step comprises a step of detecting na actual position of the shift actuator at the initiation of said predetermined brake state of the vehicle, a step of counting a time elapsed from the initiation of said predetermined brake state, and a step of calculating a predetermined equation involving as variables said actual position detected and said time counted during a time period beginning with the initiation of said predetermined brake state of the vehicle and ending with the subsequent release of said predetermined brake state of the vehicle to give a result as said second position.

17. The method as claimed in claim 16, wherein said estimating step comprises a step of varying said second position given by said calculating step by a predetermined value to give a third position, and wherein said setting step comprises a step of setting said third position as said desired position after the initiation of said predetermined brake state of the vehicle as long as said predetermined condition fails to be satisfied.

18. The method as claimed in claim 17, wherein said predetermined condition is satisfied upon the subsequent release of said predetermined brake state of the vehicle.

* * * * *